(12) United States Patent
Peterson et al.

(10) Patent No.: US 10,543,548 B2
(45) Date of Patent: Jan. 28, 2020

(54) APPARATUSES AND METHODS FOR INDUCTION HEATING

(75) Inventors: S. Barrett Peterson, Orem, UT (US); Timothy N. Sexton, Santaquin, UT (US); Curtis M. Simons, Santaquin, UT (US); Troy C. Campbell, American Fork, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 1683 days.

(21) Appl. No.: 12/425,304

(22) Filed: Apr. 16, 2009

(65) Prior Publication Data

US 2010/0264134 A1 Oct. 21, 2010

(51) Int. Cl.
*H05B 6/36* (2006.01)
*H05B 6/02* (2006.01)
*B23K 1/002* (2006.01)

(52) U.S. Cl.
CPC .................................... *B23K 1/002* (2013.01)

(58) Field of Classification Search
CPC .......... B23K 13/01; B23K 1/002; B23K 1/18; B23K 3/0475; F16C 2206/00; F16C 2206/04; F16C 33/26; F16C 43/02; F16C 2352/00; F16C 2322/12; F16C 2322/00; F16C 2233/02; F16C 2223/18; F16C 43/00; F16C 43/04; F16C 43/045; F16C 43/06; F16C 43/065; F16C 43/08; F16C 43/083; F16C 43/086
USPC ................ 219/612–617, 603, 600, 672–677, 219/635–640, 642, 652
See application file for complete search history.

(56) References Cited

U.S. PATENT DOCUMENTS

| | | | |
|---|---|---|---|
| 2,449,944 A * | 9/1948 | Johnson | 29/898.063 |
| 3,494,742 A * | 2/1970 | Lagarde, Jr. et al. | 117/221 |
| 3,752,642 A | 8/1973 | Early et al. | |
| 4,169,637 A * | 10/1979 | Voitas | 384/278 |
| T102,901 I4 | 4/1983 | Offenbacher | |
| 4,443,678 A | 4/1984 | Jacovides et al. | |
| 4,468,138 A * | 8/1984 | Nagel | F16C 17/04 228/122.1 |

(Continued)

FOREIGN PATENT DOCUMENTS

DE 10 2007 014637 10/2008
EP 0 283 982 9/1988

OTHER PUBLICATIONS

International Search Report dated Jul. 22, 2010 for International Application No. PCT/US2010/030968 (5 pages).

(Continued)

*Primary Examiner* — Tu B Hoang
*Assistant Examiner* — Diallo I Duniver
(74) *Attorney, Agent, or Firm* — Dorsey & Whitney LLP

(57) ABSTRACT

A heating apparatus for induction heating is disclosed. The heating apparatus may comprise a bearing ring, at least one bearing element disposed in the bearing ring, and a braze material adjacent to the at least one bearing element and the bearing ring. The heating apparatus may additionally comprise an inductor positioned radially adjacent to at least a portion of the bearing ring. A current source may be electrically coupled to the inductor. A bearing orienting member may also abut a surface of the at least one bearing element. The bearing orienting member may orient a surface of the at least one bearing element. A heating method is also disclosed.

18 Claims, 15 Drawing Sheets

(56) References Cited

U.S. PATENT DOCUMENTS

| | | | |
|---|---|---|---|
| 4,496,818 A | | 1/1985 | Reynolds et al. |
| 4,622,445 A | | 11/1986 | Matsen |
| 4,710,036 A | * | 12/1987 | Geczy .................... 384/275 |
| 4,720,199 A | * | 1/1988 | Geczy et al. ............. 384/282 |
| 4,732,491 A | * | 3/1988 | Geczy ...................... 384/95 |
| 4,744,836 A | * | 5/1988 | Pfaffmann ............ C21D 1/10 148/575 |
| 4,822,971 A | | 4/1989 | Peterson |
| 4,880,154 A | | 11/1989 | Tank |
| 4,892,420 A | | 1/1990 | Kruger |
| 5,837,071 A | | 11/1998 | Andersson et al. |
| 6,020,571 A | | 2/2000 | Grossklaus, Jr. et al. |
| 6,264,768 B1 | * | 7/2001 | Sonti .................... C21D 1/19 148/567 |
| 6,270,001 B1 | * | 8/2001 | Tadic ................... B23K 31/02 219/121.66 |
| 6,359,267 B1 | | 3/2002 | Wilcox et al. |
| 6,655,845 B1 | * | 12/2003 | Pope .................. A61F 2/30767 384/492 |
| 8,166,657 B2 | * | 5/2012 | Oishi et al. ............. 29/898.065 |
| 2006/0165334 A1 | * | 7/2006 | Obayashi et al. ......... 384/622 |
| 2007/0046119 A1 | | 3/2007 | Cooley |
| 2007/0046120 A1 | * | 3/2007 | Cooley et al. ............. 310/90.5 |
| 2008/0053578 A1 | * | 3/2008 | Maeda et al. ............. 148/559 |

OTHER PUBLICATIONS

Handy & Harman, Interface Corrosion in Brazed Joints in Stainless Steel, Brazing Technical Bulletin, Feb. 1989.

* cited by examiner

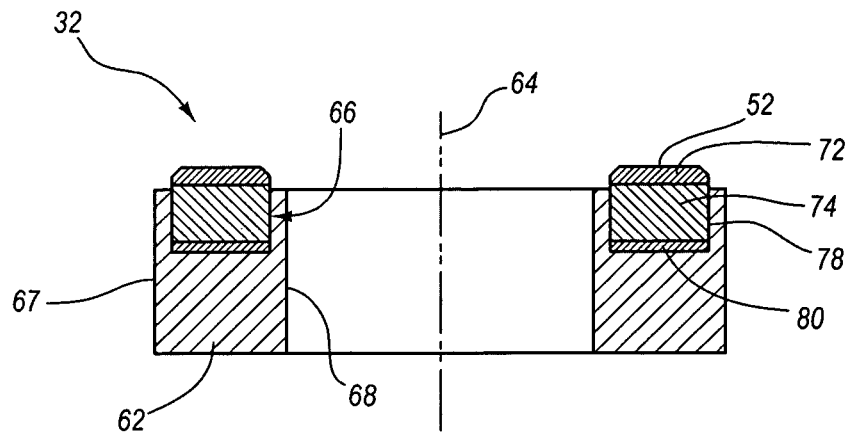
FIG. 9
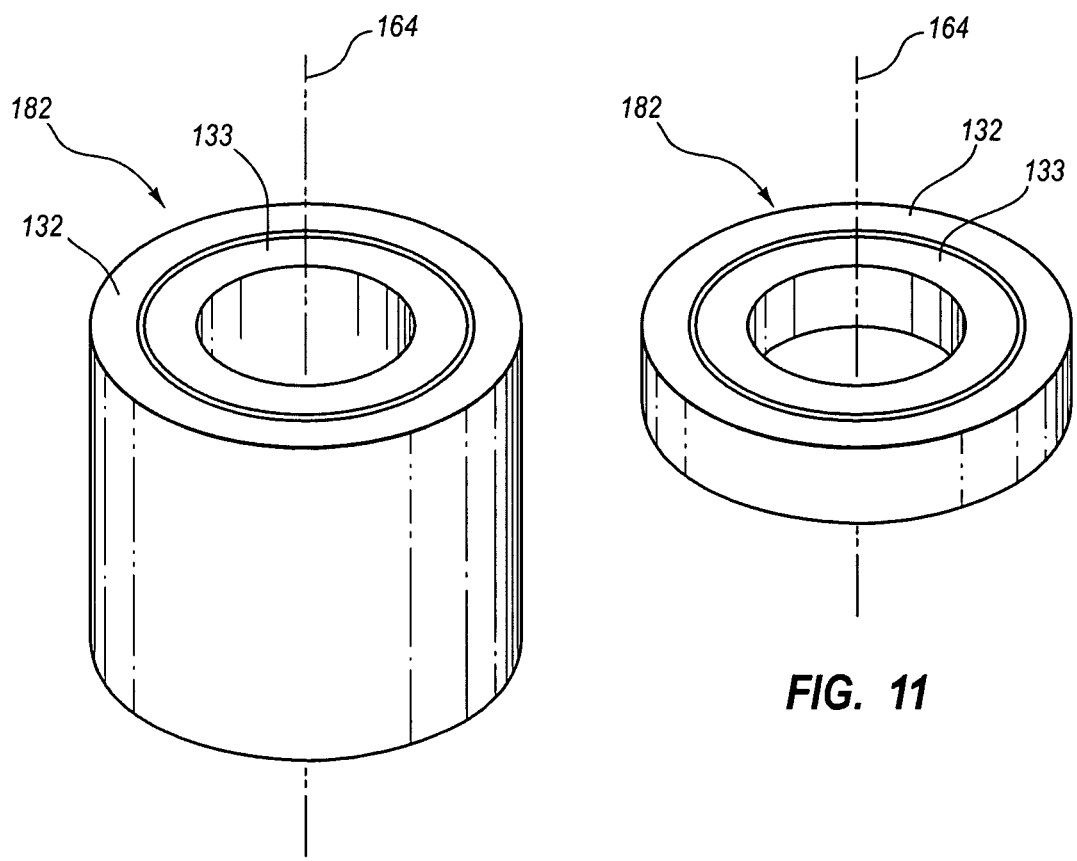
FIG. 10
FIG. 11

APPARATUSES AND METHODS FOR INDUCTION HEATING

BACKGROUND

Conventional bearing apparatuses including bearing surfaces that move relative to one another are known in the art. For example, conventional, so-called "thrust bearings" and some embodiments of radial bearings include bearing surfaces that at least partially contact and move or slide relative to one another. Such bearing surfaces may include a superhard material for resisting wear during use of the bearing apparatus. In one example, bearing surfaces in a bearing apparatus may comprise a hard material such as diamond (e.g., polycrystalline diamond).

One application for bearing apparatuses, such as thrust bearings and radial bearings, is in drilling equipment utilized in subterranean drilling. Particularly, drilling motors have been utilized for drilling boreholes into subterranean formations, especially for oil or gas exploration. In a typical downhole drilling motor, the motor is suspended at the lower end of a string of drill pipe comprising a series of pipe sections connected together at joints and supported from the surface. A rotary drill bit (e.g., a fixed cutter drill bit, roller cone drill bit, a reamer, etc.) may be supported below the drilling motor (via pipe sections, drill collars, or other structural members as known in the art) or may be directly connected to the downhole motor, if desired. Drilling fluid is commonly circulated through the pipe string and the motor to generate torque within the motor, causing the rotary drill bit to rotate. The drilling fluid may then be returned to the surface through the annular space between the drilled borehole and the drill string and may carry the cuttings of the subterranean formation to the surface.

Downhole drilling motors may include bearing apparatuses, such as thrust bearings or radial bearings. More particularly, conventional downhole drilling motors may include a non-rotating bearing ring that does not rotate and is connected to a housing of the motor and a rotating bearing ring that rotates with the output shaft of the downhole fluid motor. In one embodiment, bearing assemblies comprised of a plurality of hard bearing elements, such as diamond bearing elements, may be coupled to the rotating bearing ring and the non-rotating bearing ring. The bearing elements are positioned adjacent one another so that the diamond bearing surfaces of the non-rotating bearing ring and rotating bearing ring contact one another.

Bearing elements have traditionally been secured to bearing apparatuses through using various methods, including brazing the bearing elements to a rotating bearing ring and a non-rotating bearing ring of a bearing apparatus. However, conventional brazing techniques typically require exposing the parts to be brazed to high temperatures for extended periods of time to melt a brazing filler metal used to braze the parts. Bearing parts, such as rotating bearing rings and non-rotating bearing rings, are often placed in a heating oven for a few hours in order to heat the parts and the brazing filler metal to the appropriate brazing temperature.

SUMMARY

According to at least one embodiment, a heating apparatus may comprise a rotational support member having a rotational axis about which the rotational support member is configured to rotate. The heating apparatus may also comprise an inductor positioned adjacent to at least a portion of a bearing ring. The rotational support member may be configured to rotate relative to the inductor.

According to additional embodiments, the bearing orienting member may be configured to rotate in conjunction with the rotational support member. The heating apparatus may also comprise an alternating current source electrically coupled to the inductor. Additionally, the inductor may surround the rotational axis of the rotational support member. Further, the rotational support member may comprise a chuck configured to releasably secure a bearing ring to the rotational support member. The inductor can include at least one induction coil.

According to certain embodiments, the inductor includes a first induction coil and a second induction coil. The first induction coil may radially surround at least a portion of the second induction coil. The first induction coil may radially surround at least a portion of a bearing ring, and the bearing ring at least partially surrounds the second induction coil.

According to various embodiments, a heating apparatus may comprise a bearing ring comprising a conductive material, at least one bearing element disposed in the bearing ring, and a braze material adjacent to the at least one bearing element and the bearing ring. The heating apparatus may also comprise an inductor positioned radially adjacent to at least a portion of the bearing ring. The heating apparatus may further comprise a current source electrically coupled to the inductor. The at least one bearing element may be at least partially disposed within at least one recess defined in the bearing ring.

The heating apparatus may additionally comprise a rotational support member supporting the bearing ring. The current source electrically couple to the inductor may be an alternating current source. The inductor may include a first induction coil and a second induction coil. The first induction coil and the second induction coil may be positioned such that the first induction coil radially surrounds at least a portion of the second induction coil. At least a portion of the bearing ring may be positioned radially between the first induction coil and the second induction coil.

According to at least one embodiment, a heating apparatus may comprise a bearing ring, at least one bearing element disposed in the bearing ring, and a braze material adjacent to the at least one bearing element and the bearing ring. The heating apparatus may also comprise an inductor positioned radially adjacent to at least a portion of the bearing ring. Additionally, the heating apparatus may comprise a bearing orienting member abutting a surface of the at least one bearing element. The bearing orienting member may orient a surface of the at least one bearing element. The bearing orienting member may exert a force against the surface of the at least one bearing element and the force may be directed toward the bearing ring.

According to various embodiments, the surface of the at least one bearing element may comprise a bearing contact surface. The bearing contact surface may comprise a diamond material, such as polycrystalline diamond. The bearing orienting member may have a substantially planar surface abutting the surface of the at least one bearing element. The bearing orienting member may also be slidingly engaged with a stationary support member. In addition, one or more gaps may be defined in the bearing orienting member between the bearing ring and the stationary support member.

According to at least one embodiment, a heating method may comprise positioning at least one bearing element in a bearing ring such that a braze material is disposed between the at least one bearing element and the bearing ring. The heating method may comprise passing a current through an inductor to generate a magnetic field from the inductor. The heating method may also comprise exposing at least a portion of the bearing ring to the magnetic field generated from the inductor. Additionally, the heating method may comprise rotating the bearing ring relative to the inductor. The heating method may further comprise exerting a force against a surface of the at least one bearing element. The force exerted against a surface of the at least one bearing element may be directed toward the bearing ring. The current passed through the inductor may be an alternating current.

According to various embodiments, exposing at least a portion of the bearing ring to the magnetic field generated from the inductor may comprise heating the bearing ring, the braze material, and the polycrystalline diamond insert. Additionally, exposing at least a portion of the bearing ring to the magnetic field generated from the inductor may comprise melting the braze material. According to certain embodiments, rotating the bearing ring may comprise rotating the bearing ring about a rotational axis that passes through a central portion of the bearing ring.

According to additional embodiments, exposing at least a portion of the bearing ring to the magnetic field generated from the inductor may comprise positioning the bearing ring such that the inductor at least partially surrounds the bearing ring. Exposing at least a portion of the bearing ring to the magnetic field generated from the inductor may also comprise positioning the bearing ring such that the bearing ring at least partially surrounds the inductor. The inductor may include a first induction coil and a second induction coil. The heating method may additionally comprise passing a current through the second induction coil to generate a magnetic field from the second induction coil and exposing at least a portion of the bearing ring to the magnetic field generated from the second induction coil.

According to at least one further embodiment, a heating method may comprise providing a superabrasive compact that includes a substrate, a superabrasive material bonded to the substrate, and a base member. The heating method may comprise providing an inductor proximate to the base member, rotating the base member, and induction heating the base member.

Features from any of the described embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 9 is a cross-sectional view of a bearing ring according to at least one embodiment.

FIG. 10 is a perspective view of a bearing apparatus according to at least one embodiment.

FIG. 11 is a perspective view of a bearing apparatus according to an additional embodiment.

Figure 1:
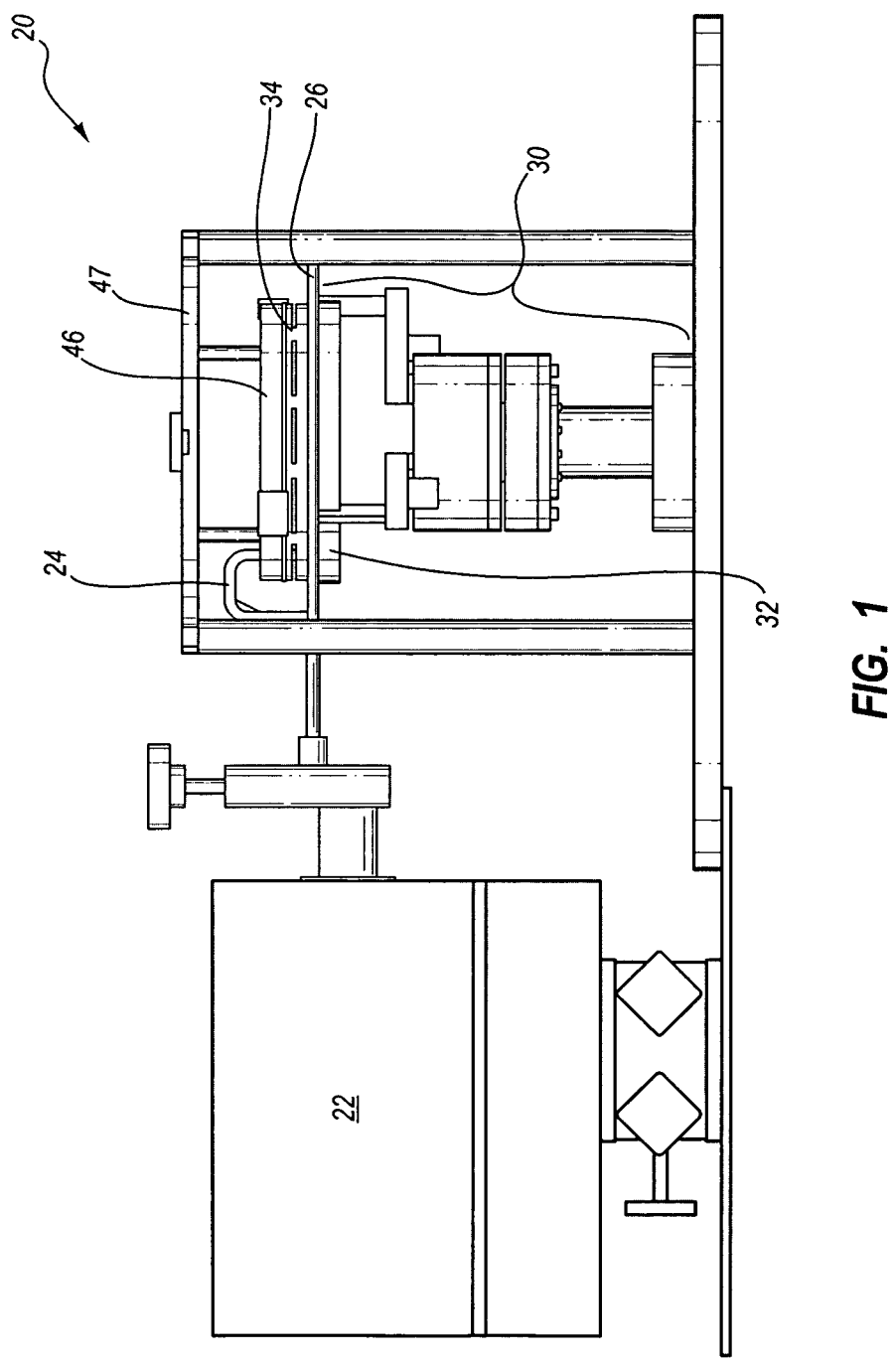
FIG. 1 is a side view of a heating apparatus according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present invention relates generally to apparatuses and methods for brazing bearing components, such as bearing rings that include bearing elements comprising superhard materials. "Superhard," as used herein, refers to any material having a hardness that is at least equal to a hardness of tungsten carbide. Additionally, as used herein, the term "bearing ring" refers to a bearing rotor, a bearing stator, and/or any other bearing ring suitable for use in a thrust bearing, a radial bearing, and/or any other suitable bearing apparatus. In one embodiment, a bearing ring may include polycrystalline diamond inserts or compacts defining a plurality of surfaces that move relative to one another. Such bearing apparatuses may encompass so-called thrust bearings, radial bearings, or other bearing apparatuses including bearing surfaces that move in relation to one another, without limitation.

When the bearing assemblies involve the use of stainless steel and are brazed in the presence of flux, the high temperatures and extended brazing times can lead to corrosion of the stainless steel around the interfaces between the brazing filler metal and the stainless steel parts. This phenomenon is referred to as braze interface corrosion. The flux material tends to selectively draw chromium out of the stainless steel, leaving a layer of chromium free steel. The chromium free steel is susceptible to corrosion attack, particularly in the presence of chlorides. This results in the formation of crevices between the brazing filler metal and the brazed part. Extended brazing times may weaken braze joints between the bearing elements and the rotating bearing ring or non-rotating bearing ring of the bearing apparatus, potentially resulting in braze joint failure.

FIG. 1 is a side view of an exemplary heating apparatus 20 according to at least one embodiment. As illustrated in this figure, heating apparatus 20 may comprise a current source 22, an inductor 24, a rotational support member 30, a bearing orienting member 34, and a support member 46. According to various embodiments, a bearing ring 32 may be mounted to heating apparatus 20. Current source 22 may comprise any current source that provides or is capable of providing an electrical current to inductor 24. For example, current source 22 may provide an alternating current to inductor 24.

Inductor 24 may comprise any type of wire, tubing, or rod capable of conducting an electrical current provided by current source 22. Inductor 24 may be formed from any suitable conductive material or combination of materials, such as, for example, copper. At least a portion of inductor 24 may be formed into one or more coils, such as first induction coil 26. According to at least one embodiment, an alternating current provided to inductor 24 by current source 22 may be conducted through first induction coil 26. As first induction coil 26 conducts an alternating current, a magnetic field (i.e., an electromagnetic field) may be generated from first induction coil 26.

As shown in FIG. 1, first induction coil 26 may at least partially surround bearing ring 32 when rotational support member 30 is suitably positioned. According to at least one embodiment, a second induction coil (see, e.g., second induction coil 28 in FIG. 4) may be positioned such that bearing ring 32 at least partially surrounds the second induction coil. A second induction coil may comprise inductor 24 and may be electrically coupled with first induction coil 26. As shown in FIG. 1, a portion of inductor 24 may lead to a second induction coil proximate to an interior area of bearing ring 32.

According to various embodiments, rotational support member 30 may be lowered and raised to ease mounting and removal of bearing ring 32 on rotational support member. Bearing ring 32 may be supported on rotational support member 30 such that it may be rotated within an interior portion of first induction coil 26 when rotational support member 30 is raised. Additionally, bearing ring 32 may be disposed adjacent to first induction coil 26 such that at least a portion of bearing ring 32 interacts with a magnetic field generated from first induction coil 26. For example, bearing ring 32 may be positioned adjacent to first induction coil 26 so that first induction coil 26 surrounds at least a portion of bearing ring 32.

Bearing orienting member 34 may be positioned such that it is adjacent to bearing ring 32 when rotational support member 30 is raised. Bearing orienting member 34 may contact one or more bearing elements disposed in bearing ring 32 (see, e.g., bearing elements 31 in FIGS. 3 and 4). Bearing orienting member 34 may generally align surfaces (see, e.g., bearing contact surfaces 52 in FIG. 3) of the one or more bearing elements disposed in bearing ring 32 in a substantially common plane, the surfaces forming a substantially planar bearing contact surface. According to at least one embodiment, bearing orienting member 34 may be slidingly engaged with a support member 46. Support member 46 may support bearing orienting member 34 while allowing rotation of bearing orienting member 34 in conjunction with rotation of bearing ring 32. As shown in FIG. 1, support member 46 may support bearing orienting member 34 from above, and additionally, support member 46 may be secured to a support structure or frame, such as stationary support structure 47 located above and/or around support member 46 and/or additional portions of heating apparatus 20. Stationary support structure 47 may comprise a stationary support framework.

Figure 2:
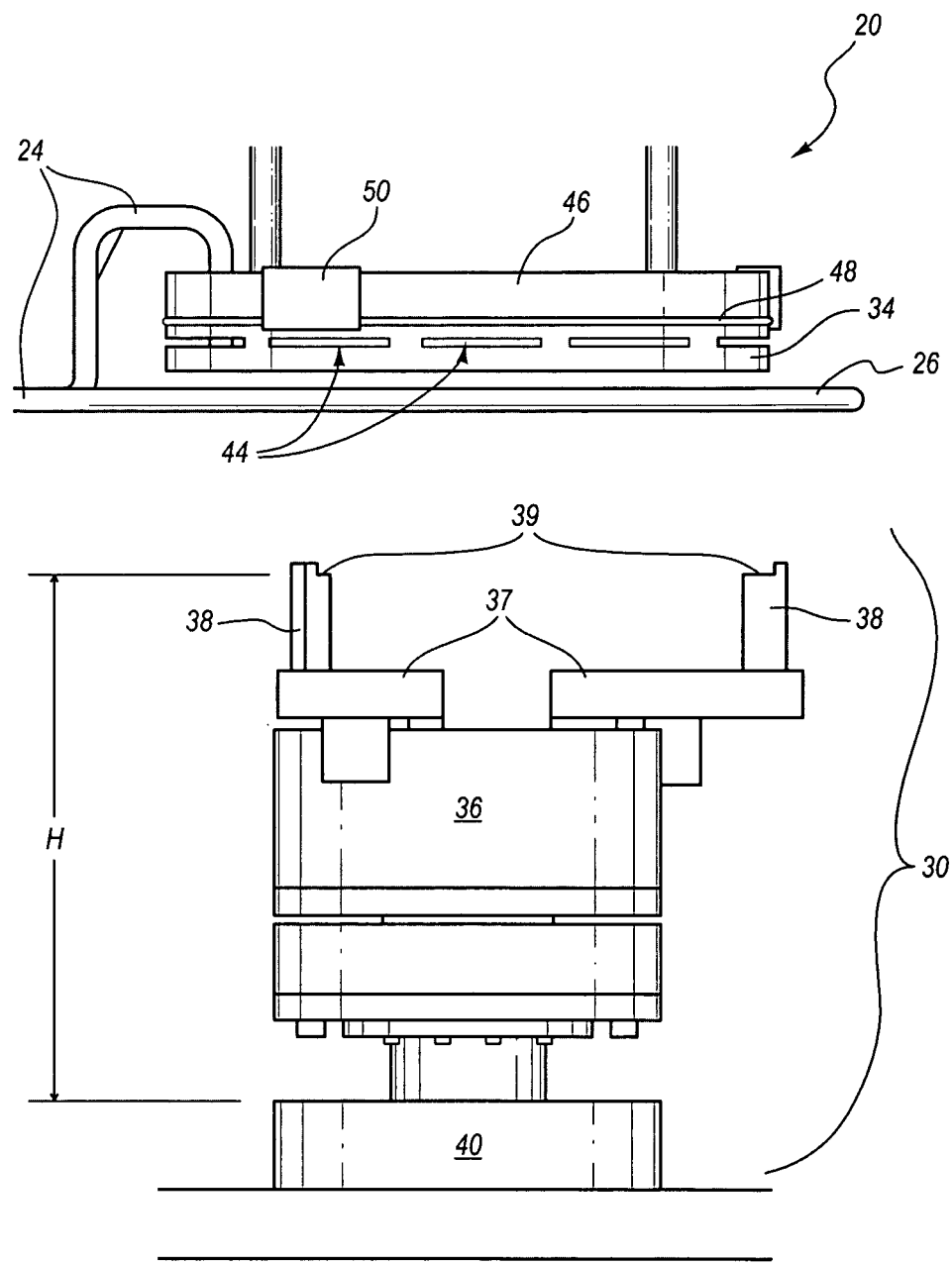
FIG. 2 is a side view of a portion of a heating apparatus according to an additional embodiment.

FIG. 2 illustrates a portion of an exemplary heating apparatus 20 in which rotational support member 30 is in a first position and a bearing ring 32 is not mounted to rotational support member 30. As shown in this figure, rotational support member 30 may include a chuck 36 and a height adjustment mechanism 40. Chuck 36 may include two or more chuck jaws 37 and two or more support arms 38 attached to chuck jaws 37. In at least one embodiment, chuck 36 may comprise three chuck jaws 37, each of which may be attached to a support arm 38. End portions of support arms 38 may be formed to accept a bearing ring 32. For example, as shown in FIG. 2, an end portion of each of support arms 38 may comprise a support recess 39 that is shaped to accept a corresponding portion of bearing ring 32. In additional embodiments, support recesses 39 defined in support arms 38 may be stepped so that bearing rings of varying diameters may be mounted to support arms 38. In at least an additional embodiment, bearing ring 32 may be mounted directly to chuck 36 or to one or more support arms extending from rotational support member 30.

An operator may load bearing ring 32 onto support arms 38 by opening chuck jaws 37 such that bearing ring 32 may be seated in support recesses 39 on support arms 38, wherein the support recesses 39 are facing radially inward. Chuck jaws 37 may be opened to a diameter where bearing ring 32 is loosely seated in support recesses 39. Subsequently, chuck jaws 37 may be moved radially inward, causing support arms 38 to likewise move radially inward. Accordingly, support recesses 39 may contact outer portions of bearing ring 32, thereby holding bearing ring 32. Following brazing, bearing ring 32 may be removed from rotational support member 30 by opening chuck jaws 37 to a diameter sufficient to release rotational support member 30 from support arms 38.

In other embodiments, the support recesses 39 are arranged facing radially outward. An operator may load bearing ring 32 onto support arms 38 by closing chuck jaws 37 such that bearing ring 32 may be seated in support recesses 39 on support arms 38. Chuck jaws 37 may be retracted or closed to a smaller diameter where bearing ring 32 is loosely seated in support recesses 39. Subsequently, chuck jaws 37 may be moved radially outward, causing support arms 38 to likewise move radially outward. Accordingly, support recesses 39 may contact inner portions of bearing ring 32, thereby holding bearing ring 32. Following brazing, bearing ring 32 may be removed from rotational support member 30 by closing or retracting chuck jaws 37 to a smaller diameter sufficient to release rotational support member 30 from support arms 38.

Rotational support member 30 may also include a height adjustment mechanism 40 configured to adjust the height of rotational support member 30, and likewise, to move a bearing ring 32 mounted to rotational support member 30 to a selected height H, as shown in FIG. 2 to be a distance measured from support recesses 39 to a surface 41 of the height adjustment mechanism 40. Height adjustment mechanism 40 may comprise a support post or other suitable supporting member. Additionally, height adjustment mechanism 40 may comprise a height adjustment device configured to raise and lower portions of rotational support member 30, including chuck 36. Height adjustment mechanism 40 may comprise a piston, a gear, and/or any other suitable mechanism for moving portions of rotational support member 30. In at least one embodiment, height adjustment mechanism 40 may produce a force toward bearing orienting member 34 such that bearing ring 32 and/or bearing elements (see, e.g., bearing elements 31 in FIG. 3) disposed in bearing ring 32 may be forced against bearing orienting member 34.

Bearing orienting member 34 may comprise one or more gaps 44 defined in a portion of bearing orienting member 34, as shown in FIG. 2. According to various embodiments, bearing orienting member 34 may be rotationally engaged with a support member 46. Additionally, bearing orienting member 34 may comprise a lip 48 extending around a peripheral portion of bearing orienting member 34. One or more engagement members 50 may be attached to support member 46 and each engagement member 50 may have a track or recess configured to engage lip 48 of bearing orienting member 34. Lip 48 of bearing orienting member 34 may be slidingly engaged with engagement members 50, and accordingly, lip 48 may slide through engagement members 50 as bearing orienting member 34 rotates relative to support member 46.

A portion of inductor 24 may form a first induction coil 26, as shown in FIG. 2. First induction coil 26 may extend radially around an area where a bearing ring 32 may be positioned when bearing ring 32 is mounted to rotational support member 30 and rotational support member 30 is suitably positioned. According to certain embodiments, a portion of inductor 24 may form a second induction coil disposed radially inward relative to first induction coil 26.

Figure 3:
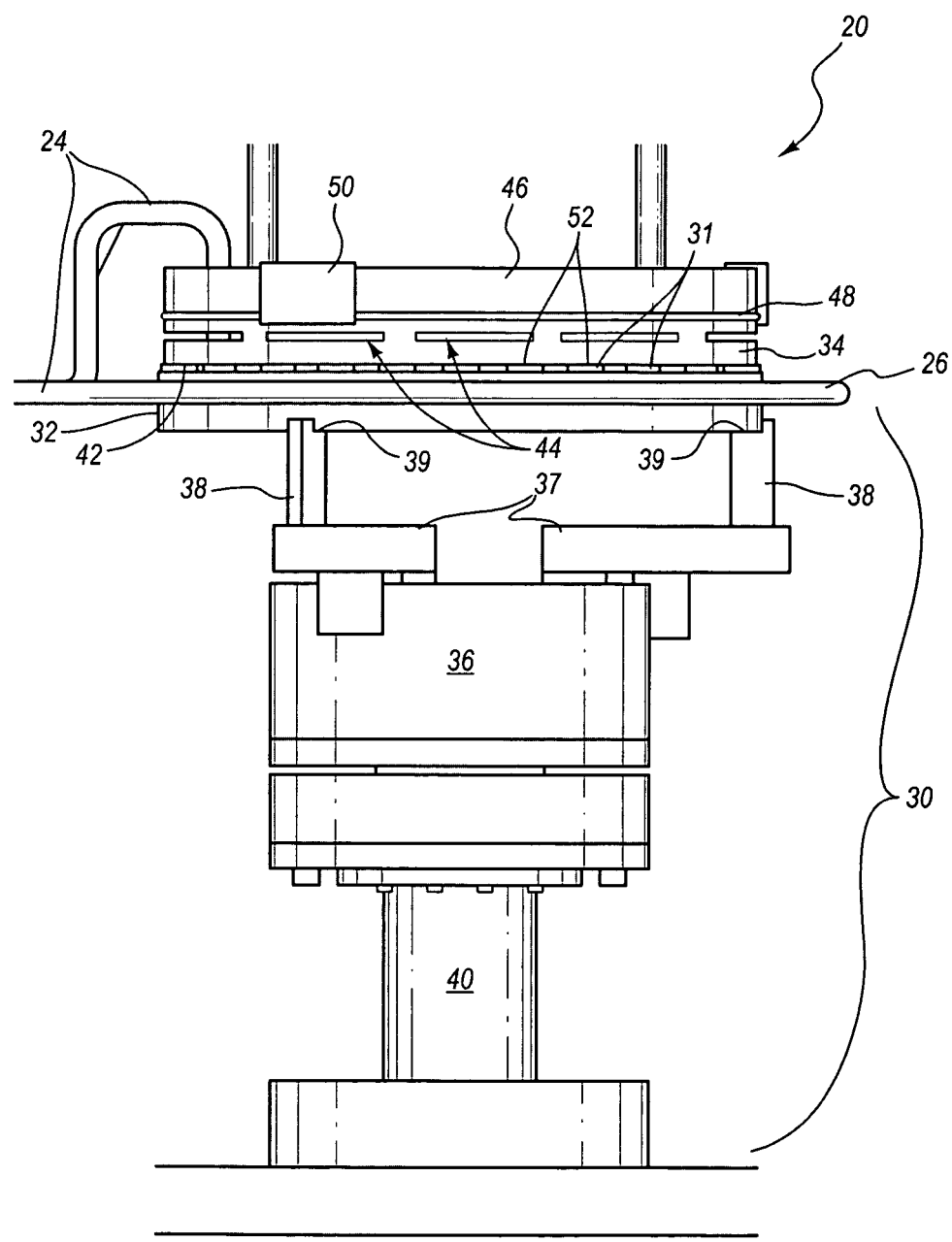
FIG. 3 is a side view of a portion of a heating apparatus according to an additional embodiment.

FIG. 3 illustrates a portion of bearing apparatus 20 shown in FIG. 2 in which a bearing ring 32 is mounted to rotational support member 30 and rotational support member 30 is in a position. As illustrated in this figure, bearing ring 32 may be mounted on support arms 38 attached to chuck 36 of rotational support member 30, and height adjustment mechanism 40 of rotational support member 30 may be disposed in a raised position. Additionally, one or more bearing elements 31 may be disposed in bearing ring 32. For example, bearing elements 31 may be at least partially disposed within one or more recesses defined in bearing ring 32.

At least a portion of bearing elements 31 may protrude from a portion of bearing ring 32. For example, a portion of bearing elements 31 may extend into recesses defined in bearing ring 32 and a remaining portion of bearing elements 31 may extend outwardly from bearing ring 32. In at least one embodiment, bearing elements 31 may extend from bearing ring 32 in a direction substantially parallel to an axis around which bearing ring 32 (e.g., a thrust bearing ring) is substantially centered. Further, bearing elements 31 may be suitably radially positioned with respect to an axis around which bearing ring 32 (e.g., a radial bearing) is substantially centered. Additionally, at least one bearing element 31 may comprise a bearing contact surface 52 facing away from a portion of bearing ring 32 in which bearing element 31 is disposed. Bearing contact surface 52 may be configured to contact a portion of another adjacent bearing contact surface in a bearing apparatus. For example, a bearing contact surface 52 of a bearing element 31 mounted to a rotor in a thrust bearing apparatus may be configured to contact a bearing contact surface 52 of a bearing element 31 mounted to a stator in the thrust bearing apparatus.

Bearing orienting member 34 may include a bearing orienting surface 42 configured to contact and orient bearing elements 31 disposed in bearing ring 32 mounted to rotational support member 30. According to at least one embodiment, bearing ring 32 may be mounted to rotational support member 30 and may be positioned via height adjustment mechanism 40 until one or more surfaces of bearing elements 31 disposed in bearing ring 32 contact bearing orienting surface 42. Bearing orienting member 34 may comprise one or more gaps 44 defined in a portion of bearing orienting member 34. For example, as illustrated in FIG. 3, a plurality of gaps 44 may be defined in bearing orienting member 34 at locations on bearing orienting member 34 between bearing orienting surface 42 and a part of bearing orienting member 34 adjacent to support member 46.

As shown in FIG. 3, bearing contact surfaces 52 of one or more bearing elements 31 disposed in bearing ring 32 may face toward bearing orienting member 34 when bearing ring 32 is mounted to rotational support member 30. Additionally, bearing contact surfaces 52 of one or more bearing elements 31 disposed in bearing ring 32 may contact bearing orienting surface 42 of bearing orienting member 34. According to at least one embodiment, bearing orienting surface 42 may comprise a substantially planar surface of bearing orienting member 34. For example, bearing orienting surface 42 may be substantially planar and may be configured to contact one or more bearing contact surfaces 52 of bearing elements 31.

Accordingly, bearing contact surfaces 52 of bearing elements 31 may be substantially aligned with bearing orienting surface 42 and/or each other. Optionally, the plurality of bearing contact surfaces 52 of bearing elements 31 may be substantially aligned by bearing orienting surface 42 of bearing orienting member 34 such that they are configured to contact adjacent bearing contact surfaces in a bearing apparatus. According to other embodiments, bearing orienting member 34 does not have a substantially planar bearing orienting surface 42 as shown in FIG. 3, but rather, bearing orienting member 34 may comprise a one or more bearing orienting surfaces of varying shapes and configurations configured to abut and/or orient one or more bearing elements 31 in bearing ring 32. Bearing orienting member 34 may orient and maintain each of bearing elements 31 in a desired position within bearing ring 32 during brazing of bearing elements 31 to bearing ring 32 using heating apparatus 20.

Figure 4:
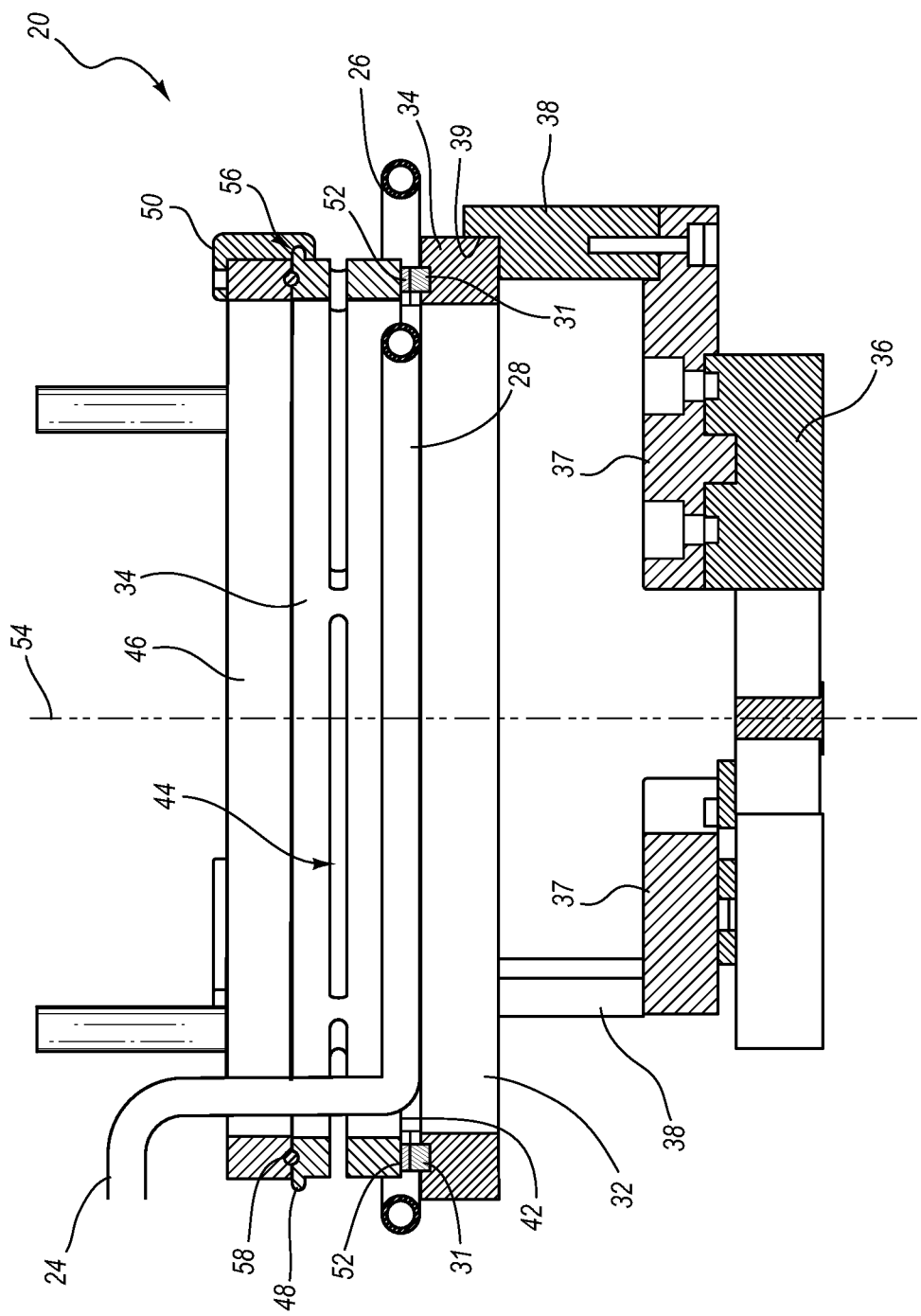
FIG. 4 is a cross-sectional view of a portion of a heating apparatus according to an additional embodiment.

FIG. 4 is a cross-sectional view of a portion of the heating apparatus shown in FIG. 3. As illustrated in FIG. 4, bearing ring 32, rotational support member 30, and/or bearing orienting member 34 may be generally centered with respect to rotational axis 54. Rotational support member 30 may substantially surround rotational axis 54 and at least a portion of rotational support member 30, including chuck 36, may rotate about rotational axis 54. Similarly, a bearing ring 32 mounted to rotational support member 30 may substantially surround rotational axis 54 and at least a portion of bearing ring 32 may rotate about rotational axis 54.

Bearing orienting member 34 and/or bearing ring 32 mounted to rotational support member 30 may substantially surround rotational axis 54, as illustrated in FIG. 4. Bearing ring 32 may comprise any suitable shape and configuration, as discussed above. According to at least one embodiment, bearing ring 32 may comprise a substantially annular shape with respect to rotational axis 54.

Similarly, bearing orienting member 34 may comprise any suitable shape and configuration, as discussed above. According to various embodiments, bearing orienting member 34 may comprise a substantially annular shape having a central portion surrounding rotational axis 54. Bearing orienting member 34 may be substantially centered with respect to rotational axis 54. According to certain embodiments, bearing orienting member 34 may comprise a substantially annular shape. As shown in FIG. 4, bearing orienting member 34 may be positioned adjacent to bearing ring 32 mounted to rotational support member 30 and/or adjacent to one or more bearing elements 31 positioned in bearing ring 32.

According to at least one embodiment, as described above, bearing orienting member 34 may be rotationally and/or slidingly engaged with support member 46. Bearing orienting member 34 may comprise a lip 48 extending around a peripheral portion of bearing orienting member 34. One or more engagement members 50 may be attached to support member 46 and each engagement member 50 may have a track or engagement recess 56 configured to engage lip 48 of bearing orienting member 34. Lip 48 of bearing orienting member 34 may be slidingly engaged with engagement recesses 56 of engagement members 50, and accordingly, lip 48 may slide through engagement members 50 as bearing orienting member 34 rotates relative to support member 46. According to certain embodiments, as illustrated in FIG. 4, one or more bearings 58 may be disposed between bearing orienting member 34 and support member 46. For example, bearing 58 (e.g., a ball bearing, roller bearing or other bearing as known in the art) may be disposed between bearing orienting member 34 and support member 46. Bearing 58, or any other suitable device, may be used to facilitate rotation of bearing orienting member 34 relative to support member 46.

As further illustrated in FIG. 4, first induction coil 26 may be disposed radially adjacent to bearing ring 32, and additionally, a second induction coil 28 may be disposed radially adjacent to first induction coil 26 and/or a bearing ring 32 mounted to rotational support member 30. Inductor 24 may extend over a portion of bearing ring 32, bearing orienting member 34, and/or support member 46 as illustrated. Second induction coil 28 and first induction coil 26 may both be formed from a common electrical conductor. According to additional embodiments, second induction coil 28 and first induction coil 26 may be formed from separate electrical conductors. As shown in FIG. 4, first induction coil 26 and second induction coil 28 may be radially adjacent to bearing ring 32, bearing orienting member 34, and/or bearing elements 31.

In additional embodiments, bearing orienting member 34 may comprise one or more gaps 44 defined in a portion of bearing orienting member 34. For example, as illustrated in FIG. 4, a plurality of gaps 44 may be defined in bearing orienting member 34 at locations on bearing orienting member 34 between bearing orienting surface 42 and a part of bearing orienting member 34 adjacent to support member 46. Bearing orienting member 34 may be structure to limit conduction of heat from a portion of bearing orienting member 34 adjacent bearing ring 32 to other portions of bearing orienting member 34 disposed adjacent to support member 46. For example, gaps 44 may limit conduction of heat from bearing ring 32 to other portions of heating apparatus 20, including support member 46, engagement member 50, and/or bearing 58. Similarly, support arms 38 on rotational support member 30 may limit conduction of heat from bearing ring 32 to other portions of heating apparatus 20, including, for example, chuck 36 and height adjustment mechanism 40, since large gaps are formed between bearing ring 32 and the other portions of rotational support member 30.

Figure 5:
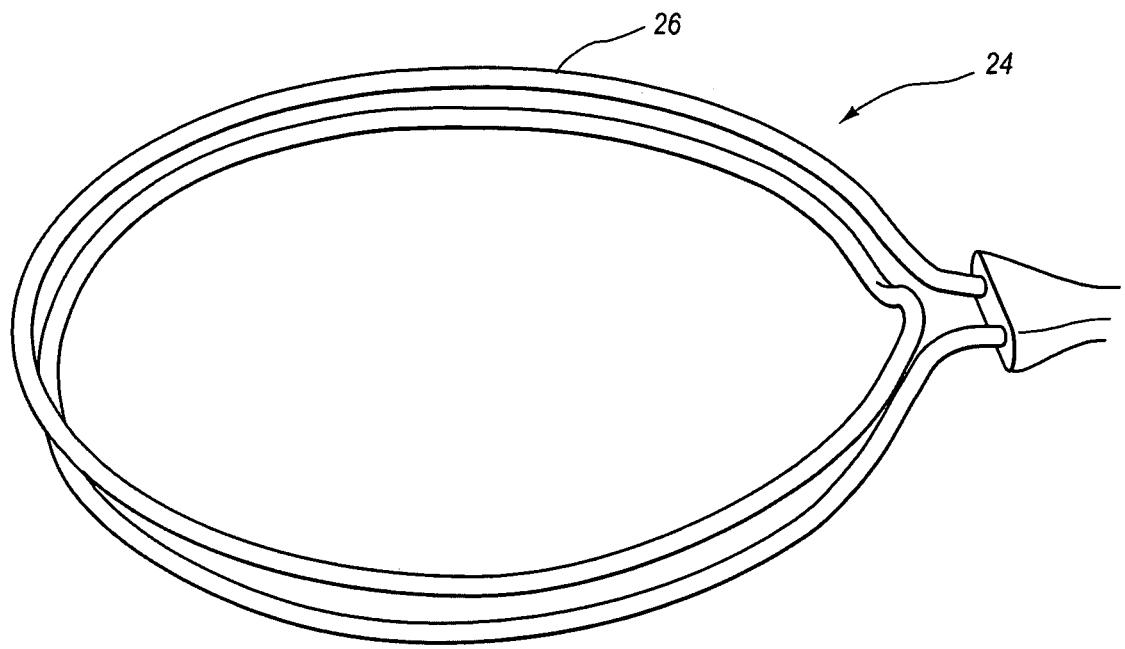
FIG. 5 is a perspective view of an inductor forming an induction coil according to at least one embodiment.
Figure 6:
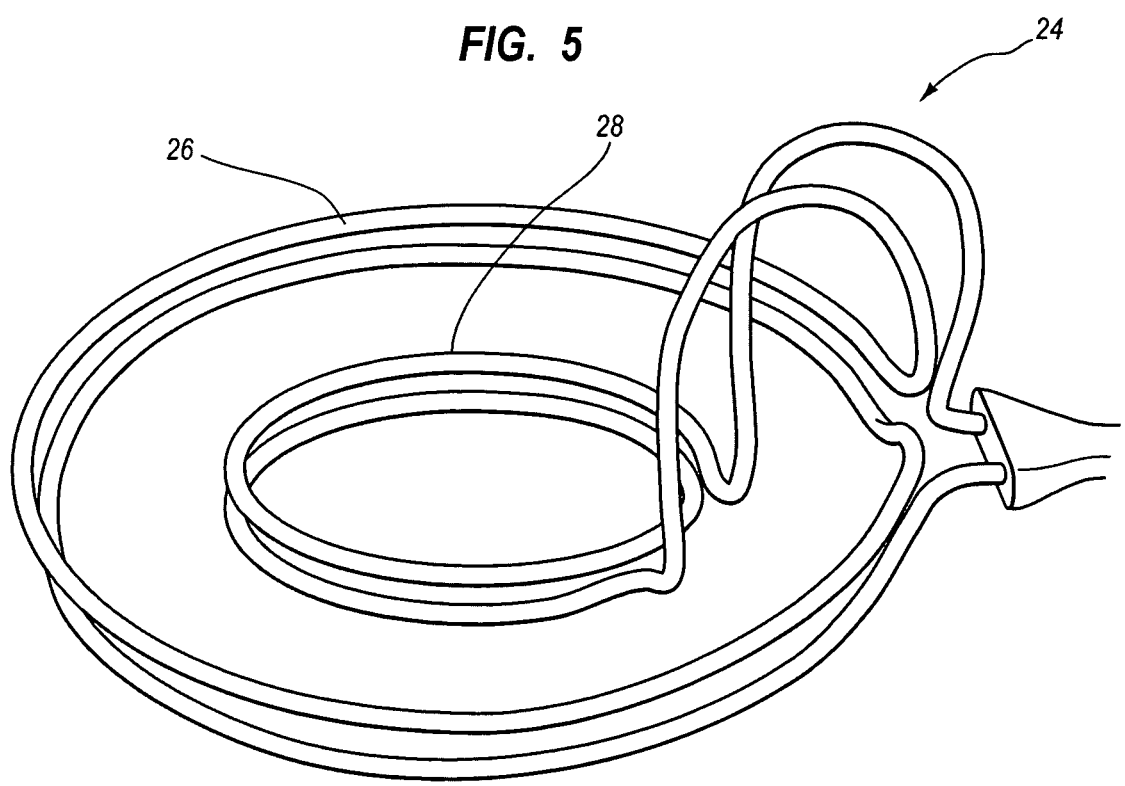
FIG. 6 is a perspective view of an inductor forming a first induction coil and a second induction coil according to an additional embodiment.

FIGS. 5 and 6 are perspective views of exemplary inductors 24 according to various embodiments. As illustrated in FIG. 5, inductor 24 may form a first induction coil 26. First induction coil 26 may comprise one or more substantially complete turns of inductor 24. For example, as shown in FIG. 5, induction coil 26 may comprise at least two substantially complete turns of inductor 24. However, first induction coil 26 may be formed to any suitable shape or size, without limitation. For example, first induction coil 26 may have a generally circular or cylindrical shape configured to at least partially surround an outer diameter of a bearing ring 32.

Inductor 24 may comprise any suitable material capable of conducting an electrical current provided by a current source (see, e.g., current source 22 in FIG. 1) Inductor 24 may be formed from any suitable conductive material or combination of materials, such as, for example, copper and/or any other suitable conductive metal. Inductor 24 may comprise any suitable diameter wire, tubing, or rod. In various embodiments, an induction coil formed from a relatively narrower turn diameter tubing may comprise more turns (e.g., helical turns) than an induction coil formed from a relatively wider turn diameter tubing.

FIG. 6 illustrates an inductor 24 that forms first induction coil 26 as well as a second induction coil 28. As illustrated in FIG. 6, second induction coil 28 may comprise one or more substantially complete turns of inductor 24. First induction coil 26 may be formed to any suitable shape or size, without limitation. For example, second induction coil 28 may have a generally circular, cylindrical, or helical shape configured to be surrounded by an inner diameter of a bearing ring 32. Accordingly, a bearing ring 32 may be positioned such that it is radially between first induction coil 26 and second induction coil 28, such as when bearing ring 32 is mounted to heating apparatus 20 (see also FIG. 4). Optionally, first induction coil 26 and second induction coil 28 may each be radially adjacent to and separated from bearing ring 32 when bearing ring 32 is mounted to heating apparatus 20. First induction coil 26 and second induction coil 28 may both be formed from a common electrical conductor, as illustrated in FIG. 6. According to additional embodiments, first induction coil 26 and second induction coil 28 may be formed from separate electrical conductors.

Figure 7:
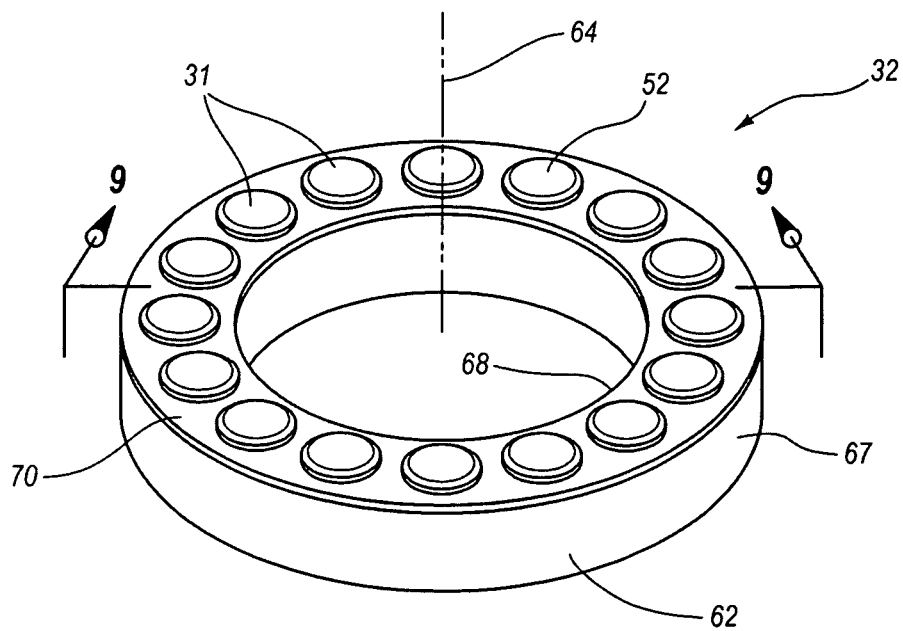
FIG. 7 is a perspective view of a bearing ring according to at least one embodiment.

FIG. 7 is a perspective view of an exemplary bearing ring 32 that may be brazed using heating apparatus 20 according to at least one embodiment. Bearing ring 32 may be a rotor, stator, or any other suitable bearing ring that may comprise a portion of a bearing apparatus, such as a thrust bearing, radial bearing, or combination bearing. As illustrated in FIG. 7, bearing ring 32 may include a bearing ring body 62 and at least one bearing element 31. Bearing elements 31 may be disposed at least partially in pockets or recesses (see, e.g., bearing ring recesses 66 in FIG. 9) defined in bearing ring body 62 of bearing ring 32. Additionally, bearing elements 31 may extend outward from bearing ring body 62. For example, a shown in FIG. 7, a portion of bearing ring elements 31 may extend beyond bearing ring body 62, extending past a bearing ring surface 70.

Bearing ring body 62 may be a generally annular-shaped or toroid-shaped configuration and may have an outer diameter 67 and/or an inner diameter 68 generally centered about a bearing ring axis 64. Bearing ring axis 64 may be generally or substantially aligned with a rotational axis 54 (see, e.g., rotational axis 54 in FIG. 4) that substantially passes through central portions of rotational support member 30 and/or bearing orienting member 34 when bearing ring 32 is mounted to rotational support member 30.

Bearing ring body 62 may be formed from any suitable material or combination of materials, such as, for example, steel and/or other metallic components. Bearing ring body 62 may comprise a generally conductive material suitable for generating eddy currents in the presence of a magnetic field, such as an electromagnetic field generated from an induction coil (see, e.g., first induction coil 26 and second induction coil 28 in FIG. 4). In at least one embodiment, eddy currents may be generated within bearing ring body 62 when it is disposed within a magnetic field. Eddy currents generated in bearing ring body 62 of bearing ring 32 may produce heat within bearing ring body 62 through Joule heating as the eddy currents pass through and encounter resistance in bearing ring body 62. Such heating may also be referred to as induction heating.

Figure 8:
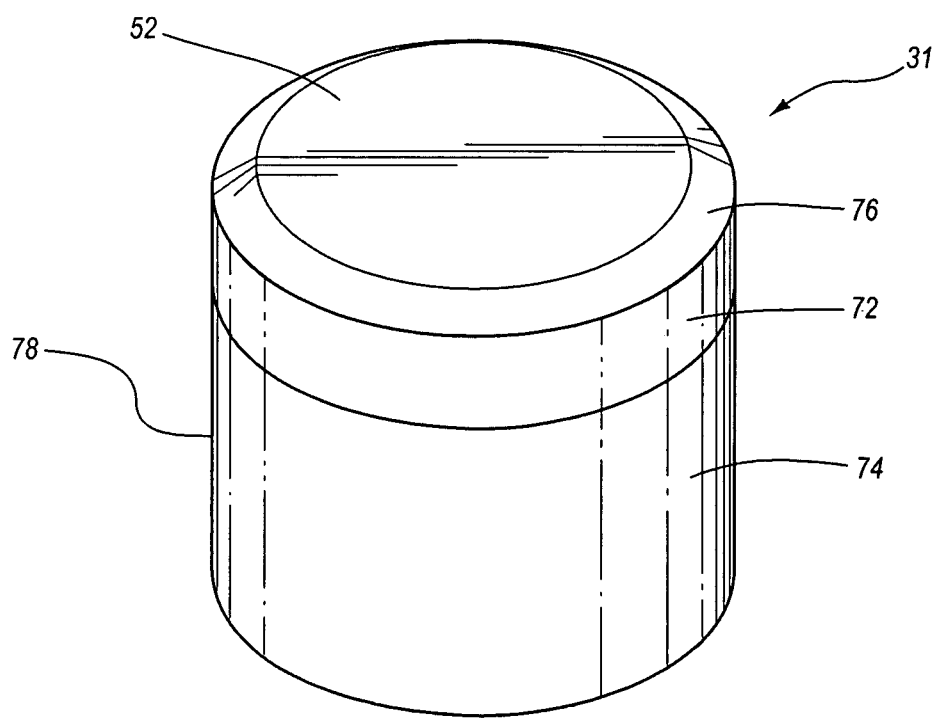
FIG. 8 is a perspective view of a bearing element according to at least one embodiment.

FIG. 8 is a perspective view of an exemplary bearing element 31 according to at least one embodiment. As illustrated in this figure, bearing element 31 may include a table 72 bonded to a substrate 74. Table 72 may include a bearing contact surface 52 and may optionally include a chamfer 76. Table 72 may comprise a superhard material, such as, for example, polycrystalline diamond, cubic boron nitride, silicon carbide, or any other suitable superhard material. Such a configuration may provide a bearing contact surface 52 that is relatively wear resistant. Bearing contact surface 52 may be substantially planar and may be configured to contact another bearing element (e.g., a bearing element coupled to a rotor) including another bearing surface that corresponds to bearing contact surface 52. According to additional embodiments, bearing contact surface 52 may comprise a non-planar surface, such as a curved surface (e.g., a convex surface and/or a concave surface).

In at least one embodiment, bearing element 31 may comprise a polycrystalline diamond compact ("PDC"), as known in the art. In such a configuration, substrate 74 may comprise, for example, a carbide substrate, such as a cobalt cemented tungsten carbide. Additionally, table 72 may comprise polycrystalline diamond that may include a catalyst (e.g., cobalt, nickel, iron, or any other suitable catalyst) used to facilitate formation of the polycrystalline diamond. According to various embodiments, at least a portion of a catalyst within table 72 may be removed using any suitable method (e.g., by acid leaching). Bearing element 31 may be formed to any suitable shape and size, such as, for example, a substantially cylindrical shape. In at least one embodiment, bearing element 31 may have a bearing element outer diameter 78 that is sized and configured to fit within a corresponding bearing ring recess 66 defined in bearing ring body 62 of bearing ring 32 (see, e.g., FIG. 9). Bearing element 31 may have a bearing element outer diameter 78 that is approximately the same size as or smaller than a diameter of a corresponding bearing ring recess 66. According to additional embodiments, bearing element 31 may have a bearing element outer diameter 78 that is larger than a diameter of a corresponding bearing ring recess 66, such as when an interference fit between bearing element 31 and bearing ring recess 66 of bearing ring 32 is desired.

FIG. 9 is a cross-sectional view of bearing ring 32 taken along line 9-9 in FIG. 7. As illustrated in this figure, bearing ring body 62 of bearing ring 32 may comprise one or more bearing ring recesses 66 defined in bearing ring body 62. Bearing ring recesses 66 may extend partially through bearing ring body 62, as shown. According to additional embodiments, bearing ring recesses 66 may form apertures extending completely through bearing ring body 62. Additionally, bearing ring recesses 66 may be open to exterior portions of bearing ring body 62 adjacent to bearing ring surface 70. Accordingly, bearing elements 31 positioned in bearing ring recesses 66 may extend beyond bearing ring body 62 past bearing ring surface 70.

According to at least one embodiment, bearing ring recesses 66 may each be positioned at substantially the same radius (i.e., generally upon a common bolt circle) and may be substantially equally circumferentially spaced with respect to one another and in relation to bearing ring axis 64. Likewise, bearing elements 31 disposed in bearing ring recesses 66 may also be positioned at substantially the same radius and may be substantially equally circumferentially spaced with respect to one another and in relation to bearing ring axis 64. In one embodiment, bearing ring recesses 66 defined in bearing ring body 62 may be substantially the same shape and/or size as one another, and corresponding bearing elements 31 may likewise by substantially the same shape and/or size. In additional embodiments, bearing recesses 66 defined in bearing ring body 62 may differ from each other in shape and/or size, and corresponding bearing elements 31 may likewise differ in shape and/or size.

As additionally shown in FIG. 9, one or more bearing elements 31 may be disposed in one or more bearing ring recesses 66 defined in bearing ring body 62 of bearing ring 32. At least a portion of bearing elements 31 may extend beyond bearing ring body 62, such that at least a portion of tables 72 extend past a surface of bearing ring body 62, such as bearing ring surface 70. Accordingly, bearing contact surface 52 on each of bearing elements 31 may be positioned beyond an exterior of bearing ring body 62 facing generally away from bearing ring body 62.

According to various embodiments, a braze material 80 may be disposed at one or more suitable locations to provide braze material for bonding at least one bearing element 31 to bearing ring body 62. For example, as illustrated in FIG. 9, braze material 80 may be positioned between bearing element 31 and bearing ring recess 66 defined in bearing ring body 62. Braze material 80 may be formed to any suitable shape and size and may be disposed at any suitable location such that it will flow (upon at least partially melting) between bearing element 31 and bearing ring recess 66. For example, braze material 80 may be positioned adjacent to a bearing element 31 and/or an associated bearing ring recess 66. in another embodiment, bearing element 31 and bearing ring recess 66 may be sized such that braze material 80 may be disposed a side wall of bearing ring recess 66 and bearing element 31. Put another way, braze material 80 may be disposed between a portion of bearing element outer diameter 78 and bearing ring recess 66.

In at least one embodiment, braze material 80 may be disposed between an end portion of bearing element 31 and an end portion of bearing ring recess 66. For example, braze material 80 having a disc shape with a diameter equal to or smaller than a diameter of bearing ring recess 66 may be placed in bearing ring recess 66, and bearing element 31 may be placed in bearing ring recess 66 such that braze material 80 is positioned in an end portion of bearing ring recess 66. According to at least one embodiment, a disc of braze material 80 may have a thickness in a range of approximately 5-10 thousandths of an inch.

Additionally, bearing ring recesses 66 and corresponding bearing elements 31 may be sized such that at least a portion of bearing elements 31 may be positioned within bearing ring recesses 66, respectively. Accordingly, a gap may exist between a bearing element 31 and a corresponding bearing ring recess 66. Bearing element 31 and bearing ring recess 66 may be sized such that a gap between bearing element 31 and bearing ring recess 66 allows braze material 80 to flow into the gap (e.g., by capillary action or by movement of bearing element to "squeeze" or otherwise cause braze material 80 to flow). In at least one embodiment, a gap between bearing element 31 and bearing ring recess 66 may have an average thickness in a range of approximately 2-5 thousandths of an inch extending circumferentially around bearing element 31. In various embodiments, braze material 80 positioned in an end portion of bearing ring recess 66 may melt and/or flow through the gap between bearing element 31 and bearing ring recess (e.g., via capillary action), the braze material surrounding at least a portion of bearing element 31. In various embodiments, braze material 80 may flow by up to a portion of bearing ring 32 adjacent to bearing ring surface 70, and may extend around a circumferential portion of bearing element 31 between bearing element 31 and bearing ring recess 66.

Braze material 80 may comprise any material suitable for forming a braze joint between adjacent parts, such as bearing element 31 and bearing ring body 62. Braze material 80 may have a melting point lower than the melting point of bearing element 31 and/or bearing ring body 62. According to various embodiments, braze material 80 may comprise a metal, such as an alloy. Braze material 80 may comprise any suitable metal or metal alloy composition, including, for example, silver, tin, zinc, copper, nickel, bronze, and/or brass. In at least one embodiment, braze material may comprise a copper-silver alloy. Braze material 80 may also be formed to any suitable shape or size prior to brazing, including, for example, a disc, a ring, a sleeve, a wire, a generally spherical bead, or any other suitable shape configured to be placed two or more parts suitable for bonding to one another.

Upon heating braze material 80 above its melting temperature, braze material 80 may melt, flow, or wet two or more parts, such as between bearing element 31 and bearing ring body 62. Subsequently, upon lowering the temperature of braze material 80, braze material 80 may form a braze joint between two or more parts, such as bearing element 31 and bearing ring body 62. A braze joint formed by braze material 80 may securely attach bearing element 31 to bearing ring body 62. Additionally, a braze joint formed by braze material 80 may have sufficient strength and/or temperature resistance to withstand forces and/or temperatures exerted on bearing element 31 and/or bearing ring body 62, such as forces exerted during operation.

FIGS. 10 and 11 illustrate various exemplary radial bearing apparatuses 182 according to certain embodiments. As illustrated in these figures, radial bearing apparatuses 182 may comprise an outer bearing ring 132 and an inner bearing ring 133. Outer bearing ring 132 may be disposed radially surrounding inner bearing ring 133. Additionally, bearing elements (see, e.g., bearing elements 131 in FIGS. 12 and 13) may be disposed in outer bearing ring 132 and/or inner bearing ring 133 such that bearing contact surfaces of bearing elements in outer bearing ring 132 contact surfaces of bearing elements in inner bearing ring 133. Outer bearing ring 132 and/or inner bearing ring 133 may each comprise one or more circumferential rows or arrays of bearing elements. Outer bearing ring 132 and/or inner bearing ring 133 may each have a generally annular-shaped or toroid-shaped configuration and may have an outer diameter and/or an inner diameter that are generally centered about a bearing ring axis 164.

Figure 12:
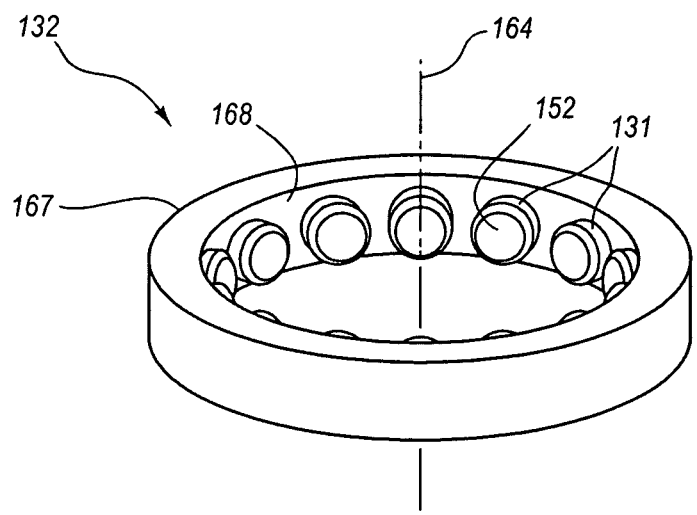
FIG. 12 is a perspective view of an outer bearing ring according to at least one embodiment.
Figure 13:
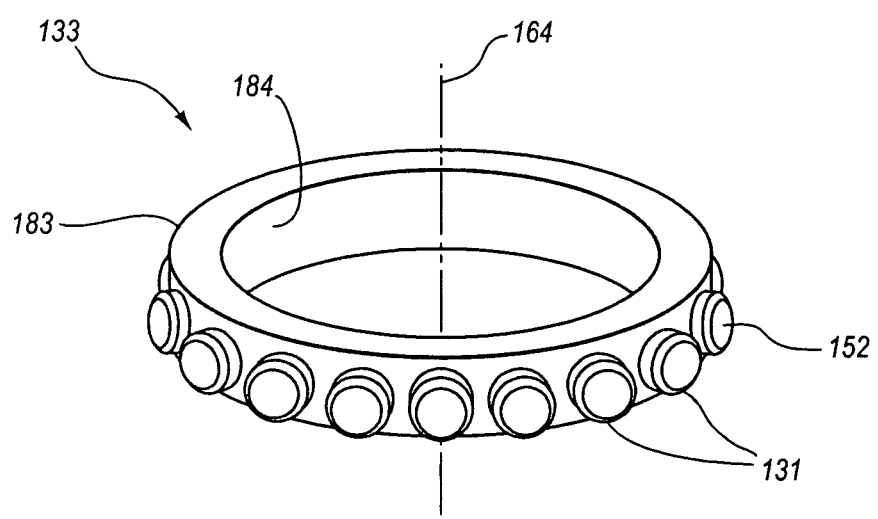
FIG. 13 is a perspective view of an inner bearing ring according to at least one embodiment.

FIGS. 12 and 13 illustrate outer bearing ring 132 and inner bearing ring 133 from bearing apparatus 182 shown in FIG. 11. As shown in these figures, outer bearing ring 132 and inner bearing ring 133 may each have at least one row or array of bearing elements 131 disposed on a circumferential surface portion. Outer bearing ring 132 shown in FIG. 12 may have an outer diameter 167 and/or an inner diameter 168 that are generally centered about bearing ring axis 164. Similarly, inner bearing ring 133 shown in FIG. 13 may have an outer diameter 183 and/or an inner diameter 184 generally centered about bearing ring axis 164. One or more bearing elements 131 may be oriented such that bearing contact surfaces 152 of bearing elements 131 face in a substantially radial direction relative to a bearing ring axis 164. For example, bearing contact surfaces 152 of bearing elements 131 mounted to outer bearing ring 132 may face in a radially inward direction. Further, bearing contact surfaces 152 of bearing elements 131 mounted to inner bearing ring 133 may face in a radially outward direction.

Outer bearing ring 132 may have at least one row or array of bearing elements 131 positioned such that they extend radially inwardly from inner diameter 168. Inner bearing ring 133 may also have at least one row or array of bearing elements 131 positioned such that they extend radially outwardly from outer diameter 183. Accordingly, bearing contact surfaces 152 of bearing elements 131 positioned in outer bearing ring 132 may face and/or contact bearing contact surfaces 152 of bearing elements 131 positioned in inner bearing ring 133 when outer bearing ring 132 and inner bearing ring 133 are operatively coupled in a radial bearing apparatus (see, e.g., radial bearing apparatus 182 in FIG. 11). Bearing contact surfaces 152 of bearing elements 131 mounted to outer bearing ring 132 and/or inner bearing ring 133 may conform to one another. For example, bearing contact surfaces 152 of bearing elements 131 mounted to outer bearing ring 132 may be substantially concave (e.g., generally cylindrical), and corresponding bearing contact surfaces 152 of bearing elements 131 mounted to inner bearing ring 133 may be substantially convex (e.g., generally cylindrical).

Figure 14:
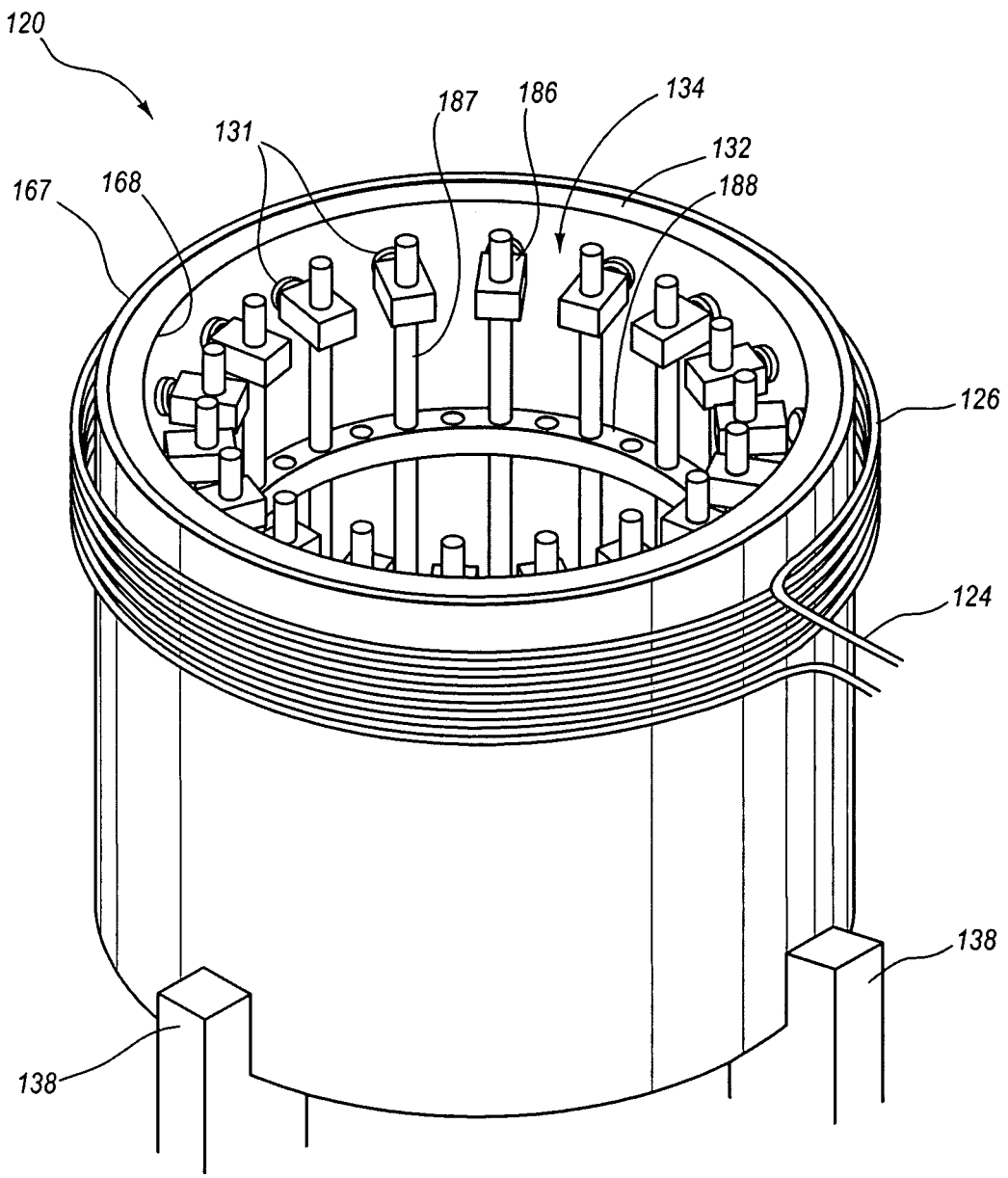
FIG. 14 is a perspective view of an outer bearing ring and a portion of a heating apparatus according to at least one embodiment.
Figure 15:
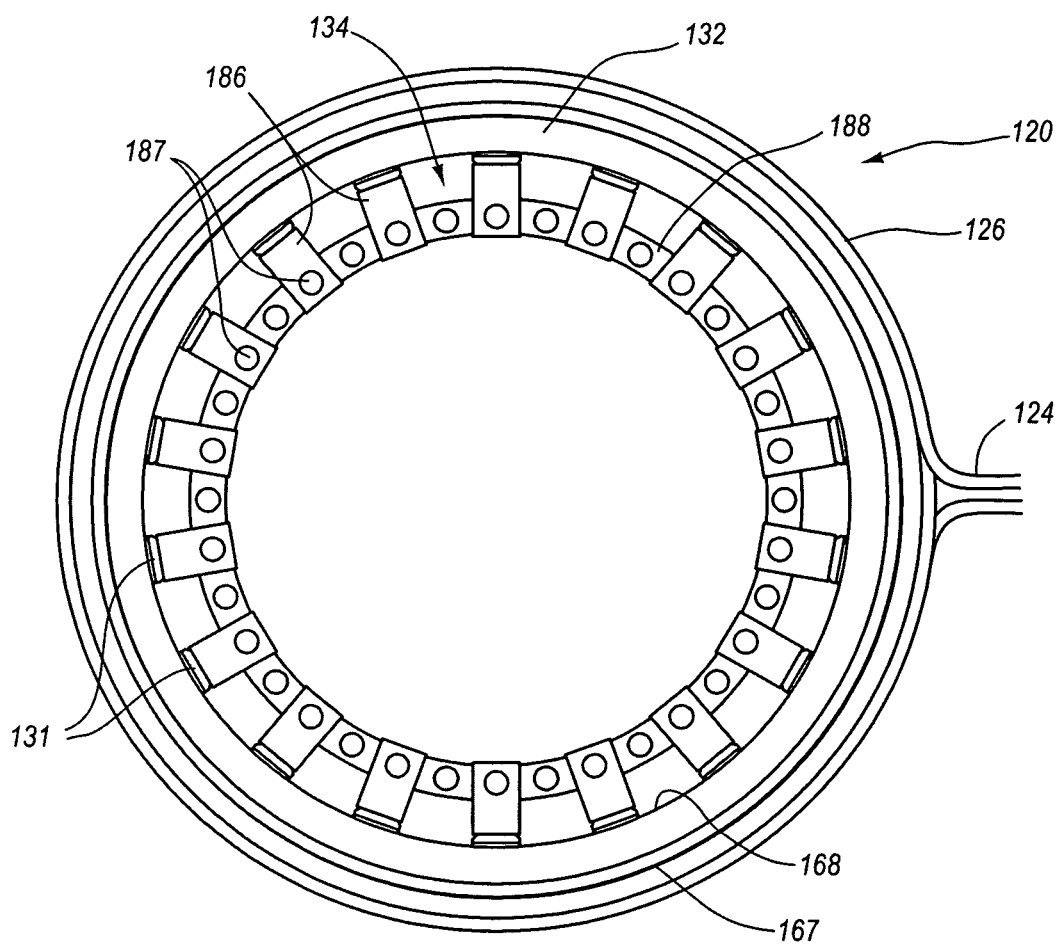
FIG. 15 is a top view of an outer bearing ring and a portion of a heating apparatus according to at least one embodiment.

FIG. 14 is a perspective view of an exemplary heating apparatus 120 in which bearing orienting member 134 is positioned adjacent to a plurality of bearing elements 131 disposed in an outer bearing ring 132. FIG. 15 is a top view of the exemplary heating apparatus 120 shown in FIG. 14, including outer bearing ring 132 and bearing orienting member 134. As shown in these figures, bearing orienting member 134 may comprise one or more bearing contact parts 186, one or more cantilever or bending rods 187, and a rod support ring 188. Cantilever rods 187 may be positioned such that they extend through holes defined in rod support ring 188. The bearing contact parts 186 may be selectively positioned and/or adjusted on corresponding cantilever rods 187.

Bearing orienting member 134 may be configured such that one or more bearing contact parts 186 contact bearing elements 131 disposed in outer bearing ring 132. According to at least one embodiment, bearing contact parts 186 may exert force against bearing elements 131 such that bearing elements 131 are held within corresponding bearing ring recesses defined in outer bearing ring 132 (see, e.g., bearing ring recesses 66 defined in bearing ring body 62 of bearing ring 32 in FIG. 9). According to additional embodiments, bearing contact parts 186 may be configured to orient bearing elements 131. Bearing contact parts 186 may exert force against bearing elements 131 when they are positioned on cantilever rods 187 as illustrated in FIGS. 14 and 15. One or more bearing elements 131 may be oriented such that surfaces of bearing elements 131 face in a substantially radial direction relative to a center of outer bearing ring 132, including, for example, a radially inward direction (see, e.g., FIG. 12).

For example, one end of each of cantilever rods 187 may be affixed to rod support ring 188. As a bearing contact part 186 is positioned on a cantilever rod 187, part of bearing contact part 186 may contact a bearing element 131 such that a portion of cantilever rod 187 is deflected away from bearing element 131 by bearing contact part 186. Accordingly, the deflected portion of cantilever rod 187 may exert force against bearing contact part 186, forcing bearing contact part 186 against bearing element 131. According to additional embodiments, two or more bearing contact parts 186 may be positioned on a single cantilever rod 187. Accordingly, bearing orienting member 134 may be used to orient two or more rows or arrays of bearing elements 131 on outer bearing ring 132.

Additionally, as shown in FIG. 14, outer bearing ring 132 may be supported by support arms 138. For example, outer bearing ring 132 may be supported by support arms 138 attached to chuck jaws on a chuck of a rotational support member (e.g., see, chuck jaws 37 on chuck 36 of rotational support member 30 in FIG. 3). A bearing orienting member 134 may be disposed adjacent to an interior portion of outer bearing ring 132 in contact with a plurality of bearing elements 131. Additionally, a first induction coil 126 formed from an inductor 124 may be positioned adjacent to an exterior of outer bearing ring 132. First induction coil 126 may be disposed radially outward from bearing elements 131.

Outer bearing ring 132 may be supported on support arms 138 of a rotational support member such that it may be rotated. Outer bearing ring 132 may be disposed adjacent to first induction coil 126 such that at least a portion of outer bearing ring 132 intersects a magnetic field generated from first induction coil 126. For example, outer bearing ring 132 may be positioned radially adjacent to first induction coil 126, wherein first induction coil 126 radially surrounds at least a portion of outer bearing ring 132. According to additional embodiments, heating apparatus 120 may comprise additional induction coils and/or may comprise at least one induction coil positioned such that it is at least partially radially surrounded by outer bearing ring 132.

Figure 16:
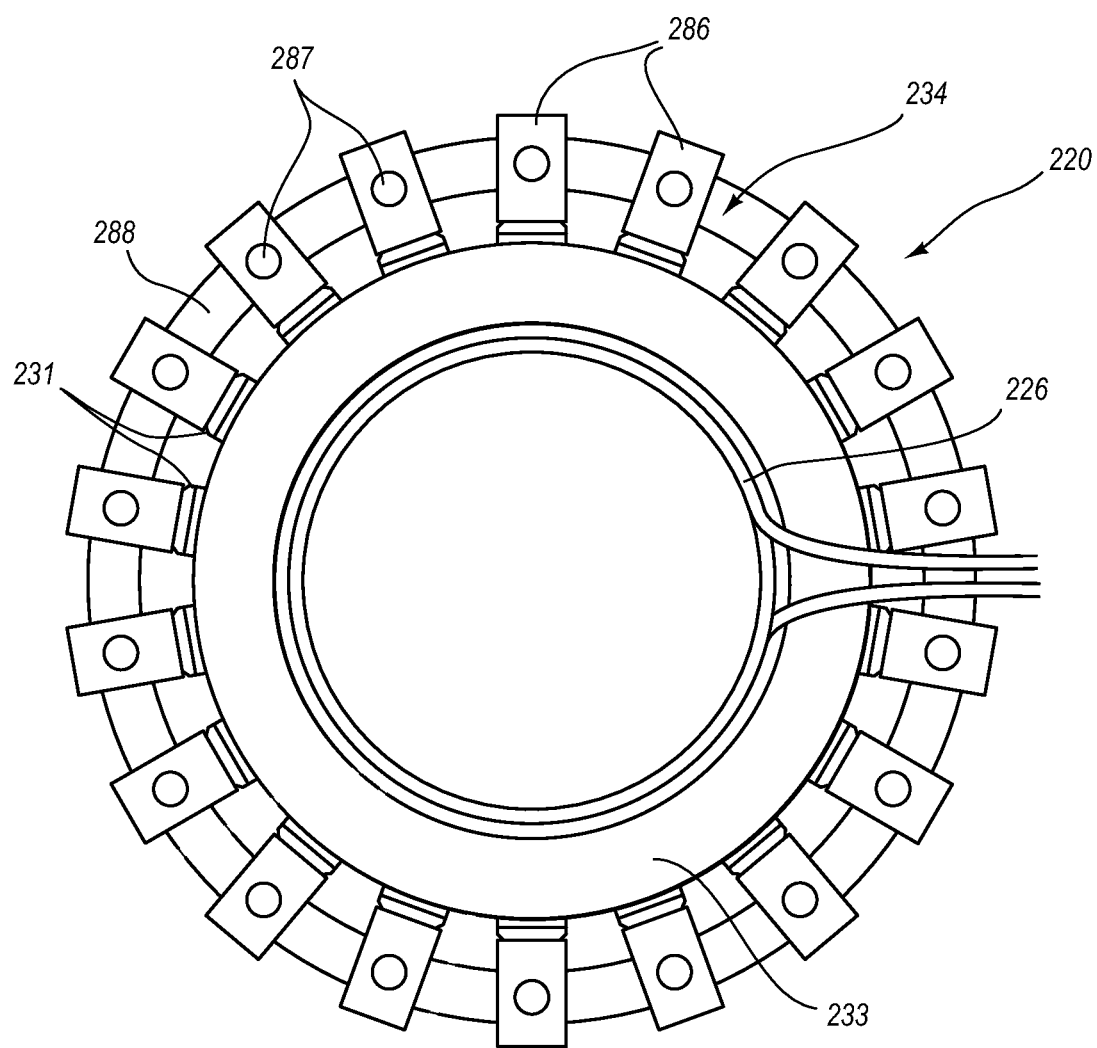
FIG. 16 is a top view of an inner bearing ring and a portion of a heating apparatus according to at least one embodiment.

FIG. 16 is a top view of an exemplary heating apparatus 220 in which bearing orienting member 234 is positioned adjacent a plurality of bearing elements 231 disposed in an inner bearing ring 233. As shown in this figure, bearing orienting member 234 may comprise one or more bearing contact parts 286, one or more cantilever rods 287, and a tension ring 288. Cantilever rods 287 may be positioned such that they extend through holes defined in tension ring 288. Bearing contact parts 286 may be selectively positioned and/or adjusted on corresponding cantilever rods 287.

Bearing orienting member 234 may be configured such that one or more bearing contact parts 286 contact bearing elements 231 disposed in inner bearing ring 233. According to at least one embodiment, bearing contact parts 286 may exert force against bearing elements 231 such that bearing elements 231 are held within corresponding bearing ring recesses defined in inner bearing ring 233 (see, e.g., bearing ring recesses 66 defined in bearing ring body 62 of bearing ring 32 in FIG. 9). According to additional embodiments, bearing contact parts 286 may be configured to orient bearing elements 231. Bearing contact parts 286 may exert force against bearing elements 231 when they are positioned on cantilever rods 287 as illustrated in FIG. 16. One or more bearing elements 231 may be oriented such that surfaces of bearing elements 231 face in a substantially radial direction relative to a center of inner bearing ring 233, including, for example, a radially outward direction (see, e.g., FIG. 13).

For example, one end of each of cantilever rods 287 may be affixed to tension ring 288. As a bearing contact part 286 is positioned on a cantilever rod 287, at least a portion of bearing contact part 286 may contact a bearing element 231 such that a portion of cantilever rod 287 is deflected away from bearing element 231 by bearing contact part 286. Accordingly, the deflected portion of cantilever rod 287 may exert force against bearing contact part 286, forcing bearing contact part 286 against bearing element 231. According to additional embodiments, two or more bearing contact parts 286 may be positioned on a single cantilever rod 287. Accordingly, bearing orienting member 234 may be used to orient two or more rows or arrays of bearing elements 231 on inner bearing ring 233. Additionally, placing two or more bearing contact parts 286 on a single cantilever rod 287 may enable a greater amount of tension to be generated in cantilever rod 287 by increasing the deflection of cantilever rod 287.

According to various embodiments, inner bearing ring 233 may be supported on a rotational support member such that it may be rotated around first induction coil 226 (see, e.g., rotational support member 30 in FIG. 3). Additionally, inner bearing ring 233 may be disposed adjacent to first induction coil 226 such that at least a portion of inner ring 233 intersects a magnetic field generated from first induction coil 226. For example, inner bearing ring 233 may be positioned radially adjacent to first induction coil 226. Optionally, first induction coil 226 may be radially surrounded by at least a portion of inner bearing ring 233. According to additional embodiments, heating apparatus 220 may comprise additional induction coils and/or may comprise at least one induction coil positioned such that it at least partially radially surrounds inner bearing ring 233.

Figure 17:
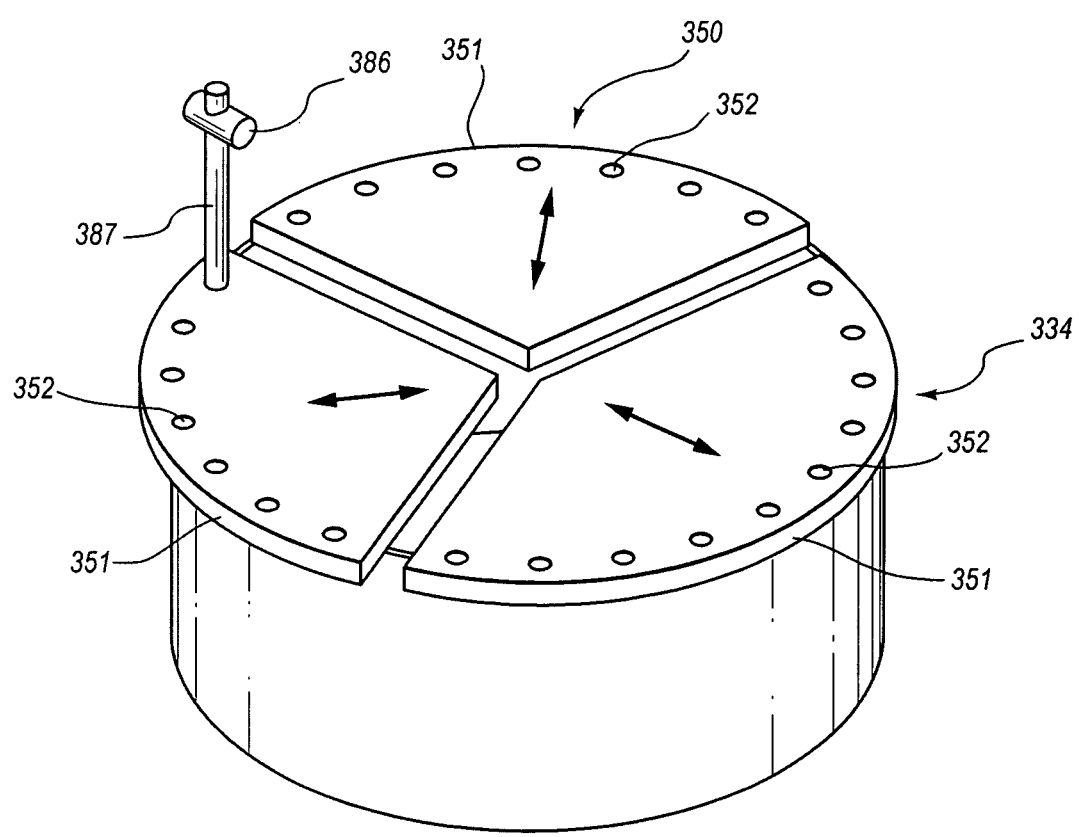
FIG. 17 is a perspective view of a portion of a heating apparatus according to at least one embodiment.

FIG. 17 is a perspective view of an exemplary bearing orienting member 334. As shown in this figure, bearing orienting member 334 may comprise one or more bearing contact parts 386, one or more cantilever rods 387, and a chuck assembly 350 that includes at least one chuck member 351. The cantilever rods 387 may be positioned such that they extend through holes 352 defined in the chuck members 351. Bearing contact parts 386 may be selectively positioned and/or adjusted on corresponding cantilever rods 387.

Bearing orienting member 334 may be configured such that one or more bearing contact parts 386 contacts a respective bearing element (e.g., one of contact bearing elements 131, 231 shown in FIGS. 14 and 16, respectively) that is disposed in an inner bearing ring (e.g., one of outer bearing ring 132 or inner bearing ring 233). Bearing contact parts 386 may exert force against the bearing elements by moving the cantilever rods 387 radially inward or radially outward upon movement of the chuck members 351 radially inward or radially outward. The cantilever rods 387 may bend after the contact parts 386 contact the bearing elements and the chuck members 351 continue to move radially inward or radially outward.

For example, one end of each of cantilever rods 387 may be affixed to a chuck member 351. As a bearing contact part 386 is positioned on a cantilever rod 387, at least a portion of bearing contact part 386 may contact a bearing element (not shown in FIG. 17) such that a portion of cantilever rod 387 is deflected away from bearing element 331 in a radially outward direction by bearing contact part 386. Accordingly, the deflected portion of cantilever rod 387 may exert force against bearing contact part 386 in a radially inward direction, forcing bearing contact part 386 against the bearing element.

Figure 18:
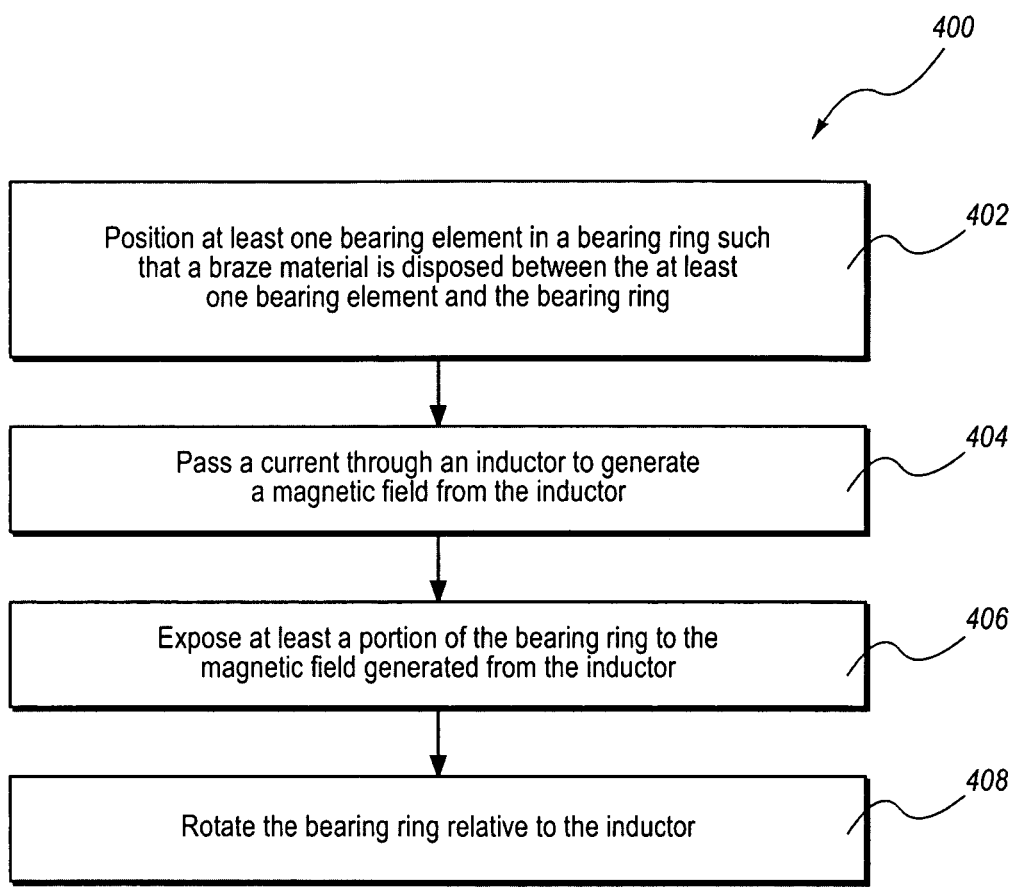
FIG. 18 is a schematic diagram of an exemplary heating method according to at least one embodiment.

FIG. 18 is a schematic diagram of an exemplary method 400 for heating a bearing ring and one or more bearing elements according to various embodiments. Method 400 may additionally be used for brazing, soldering and/or welding various parts. As illustrated in FIG. 18 (process 402), at least one bearing element may be positioned in a bearing ring and a braze material may be provided for brazing the at least one bearing element and the bearing ring. For example, a braze material 80 may be placed in a bearing ring recess 66, and a bearing element 31 may then be placed in bearing ring recess 66 such that braze material 80 is disposed between bearing element 31 and bearing ring body 62, as illustrated in FIG. 9. According to various embodiments, a flux paste may be applied to the bearing ring, the bearing elements, the braze material, and/or any additional parts that may be exposed to heat during brazing of the bearing ring and the one or more bearing elements. In another embodiment, flux may be provided in combination with the braze material. The flux paste may comprise any suitable flux composition, including a composition comprising borax, fluorides, and/or any other suitable compounds.

During process 404, a current may be passed through an inductor (e.g., an induction coil) to generate a magnetic field. A current passed through the inductor may be an alternating current. During process 406, at least a portion of the bearing ring may be exposed to the magnetic field generated from the inductor. Exposing at least a portion of the bearing ring to the magnetic field generated from the inductor may comprise heating the bearing ring and the braze material. Exposing at least a portion of the bearing ring to the magnetic field generated from the inductor may also comprise melting the braze material.

According to various embodiments, the bearing ring may be heated to a temperature sufficient to melt the braze material. Additionally, the bearing ring may be maintained at a temperature below a melting and/or degradation temperature of the bearing ring and/or the bearing elements disposed in the bearing ring (e.g., at temperatures of approximately 750° C. or higher, polycrystalline diamond may begin to degrade over time). In at least one embodiment, the bearing ring may be heated to a temperature of between approximately 425° C. and approximately 1480° C. According to additional embodiments, the bearing ring may be heated to a temperature of between approximately 700° C. and approximately 740° C. For example, the bearing ring may be heated to a temperature of approximately 710° C.

As at least a portion of the bearing ring is exposed to the magnetic field generated from the induction coil, the bearing ring may increase in temperature relatively quickly due to heat produced in the bearing ring as Eddy currents generated in the bearing ring by the magnetic field encounter resistance in the bearing ring material. The relatively rapid generation of heat in the bearing ring may enable relatively quick brazing of the bearing elements to the bearing ring through melting of the braze material. In at least one embodiment, bearing elements may be brazed to a bearing ring, such as a steel bearing ring, in a matter of minutes using a heating apparatus as described herein (see, e.g., heating apparatus 20 in FIG. 1) as opposed to up to several hours using a conventional brazing oven, thereby producing the brazed parts more quickly and efficiently. For example, the bearing ring may be exposed to the magnetic field for several minutes. In at least one embodiment, the bearing ring may be exposed to the magnetic field for a time period of between approximately 3 minutes and approximately 6 minutes. The bearing ring may also be exposed to the magnetic field for longer or shorter time periods depending on the size and shape of the bearing ring and/or the bearing elements and the heating energy applied by induction heating.

Brazing bearing elements to a bearing ring using a heating apparatus as described herein may produce relatively stronger braze joints than brazing using a conventional brazing oven. In at least one embodiment, brazing bearing elements to a bearing ring using a heating apparatus as described herein may reduce or prevent alloying of a braze material with the bearing ring material, or may reduce or prevent the formation of a chromium depleted layer in the bearing ring. Such reduction or prevention of alloying may, in turn, reduce or prevent corrosion at and around the resulting braze joints, such as corrosion occurring at, for instance, chromium-depleted zones in the bearing ring.

In one embodiment, exposing at least a portion of the bearing ring to the magnetic field generated from the induction coil may comprise positioning the bearing ring such that the induction coil at least partially surrounds the bearing ring. For example, as shown in FIG. 4, first induction coil 26 may be positioned such that it radially surrounds bearing ring 32. According to additional embodiments, exposing at least a portion of the bearing ring to the magnetic field generated from the induction coil may comprise positioning the bearing ring such that the bearing ring at least partially surrounds the induction coil. For example, as shown in FIG. 4, a second induction coil 28 may be positioned such that bearing ring 32 radially surrounds second induction coil 28. Such induction heating configurations may be employed separately or in combination, without limitation. Furthermore, any suitable induction heating configuration may be employed, including one or more inductor of any design (e.g., coils, pancake, etc.).

During process 408, the bearing ring may be rotated relative to the inductor. For example, a bearing ring 32 may be operably coupled to a rotational support member 30 such that bearing ring 32 is surrounded by first induction coil 26, as illustrated in FIG. 3. Rotational support member 30 may then be rotated, causing bearing ring 32 to rotate generally about rotational axis 54 (see, e.g., rotational axis 54 in FIG. 4). Accordingly, rotational support member 30 may cause bearing ring 32 to rotate relative to first induction coil 26. Rotating the bearing ring 32 relative to the induction coil 26 adjacent to the bearing ring 32 may enable the bearing ring to be rotated relative to the magnetic field generated from the induction coil 26. Accordingly, heat may be generated in the bearing ring 32 relatively consistently around the bearing ring 32 in comparison with a bearing ring that is placed in a magnetic field but is not rotated. Heating the bearing ring 32 relatively consistently may enable the production of a bearing ring that has bearing elements brazed to it with relatively consistent braze joints.

Figure 19:
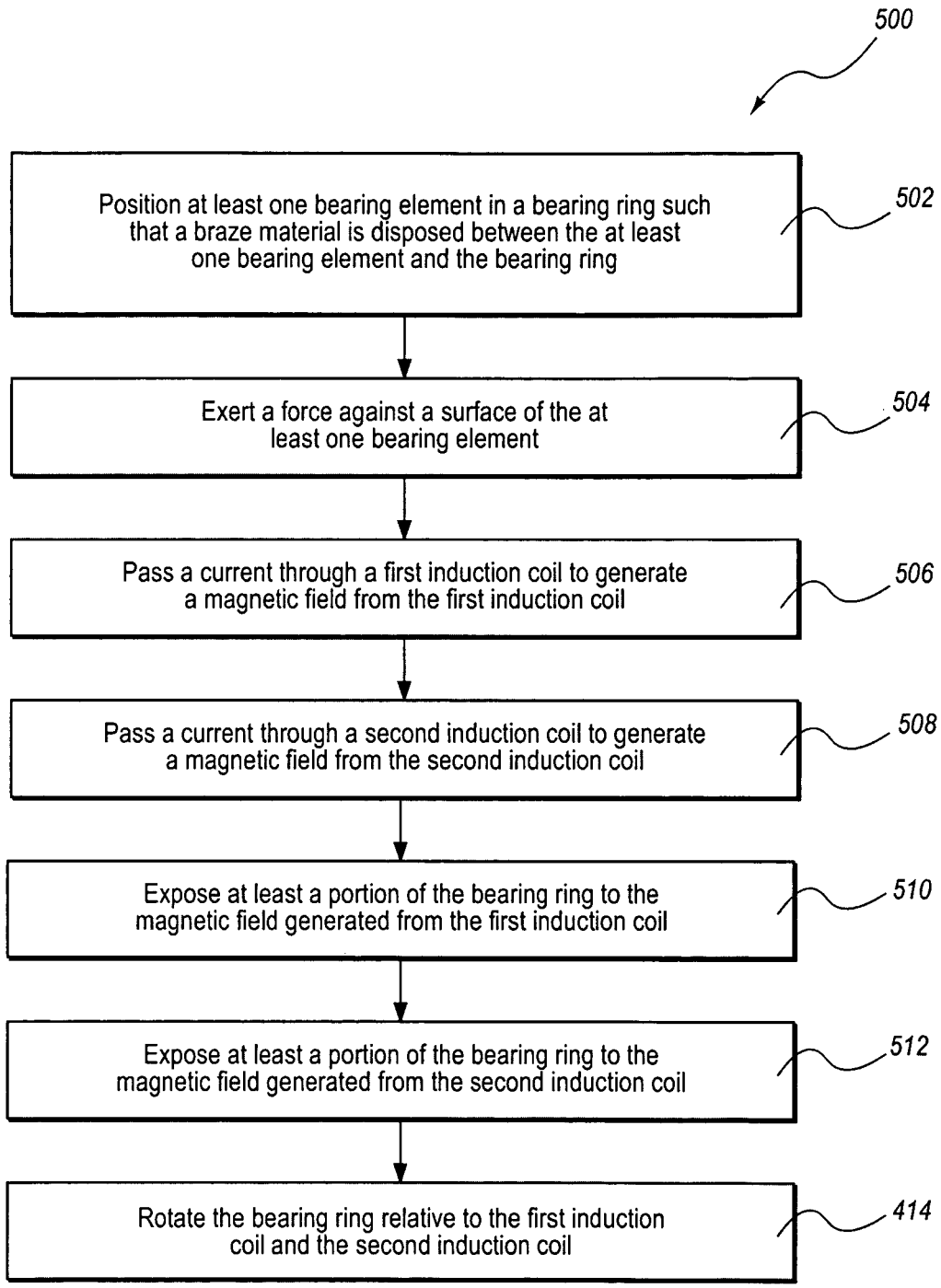
FIG. 19 is a schematic diagram of an exemplary heating method according to an additional embodiment.

FIG. 19 is a schematic diagram of an exemplary method 500 for brazing a bearing ring according to one or more embodiments. Method 500 may additionally be used for soldering and/or welding various parts. As illustrated in FIG. 19 (process 502), at least one bearing element may be positioned in a bearing ring such that a braze material is available to the at least one bearing element and the bearing ring. As shown by process 504, a force may be exerted against a surface of the at least one bearing element. A force exerted against a surface of the at least one bearing element may be directed generally toward the bearing ring. During process 506, a current may be passed through a first induction coil to generate a magnetic field from the first induction coil. During process 508, a current may be passed through a second induction coil to generate a magnetic field from the second induction coil.

As shown by process 510, at least a portion of the bearing ring may be exposed to the magnetic field generated from the first induction coil. During process 512, at least a portion of the bearing ring may be exposed to the magnetic field generated from the second induction coil. Exposing at least a portion of the bearing ring to the magnetic field generated from the first induction coil and/or the magnetic field generated from the second induction coil may comprise heating the bearing ring and the braze material. Exposing at least a portion of the bearing ring to the magnetic field generated from the first induction coil and/or the magnetic field generated from the second induction coil may also comprise melting the braze material.

Optionally, exposing at least a portion of the bearing ring to the magnetic field generated from the first induction coil and/or the magnetic field generated from the second induction coil may comprise positioning the bearing ring such that at least one of the first induction coil and/or the second induction coil at least partially surrounds the bearing ring. According to additional embodiments, exposing at least a portion of the bearing ring to the magnetic field generated from the first induction coil and/or the magnetic field generated from the second induction coil may comprise positioning the bearing ring such that the bearing ring at least partially surrounds at least one of the first induction coil and/or the second induction coil. As shown by process 514, the bearing ring may be rotated relative to the first induction coil and the second induction coil.

Figure 20:
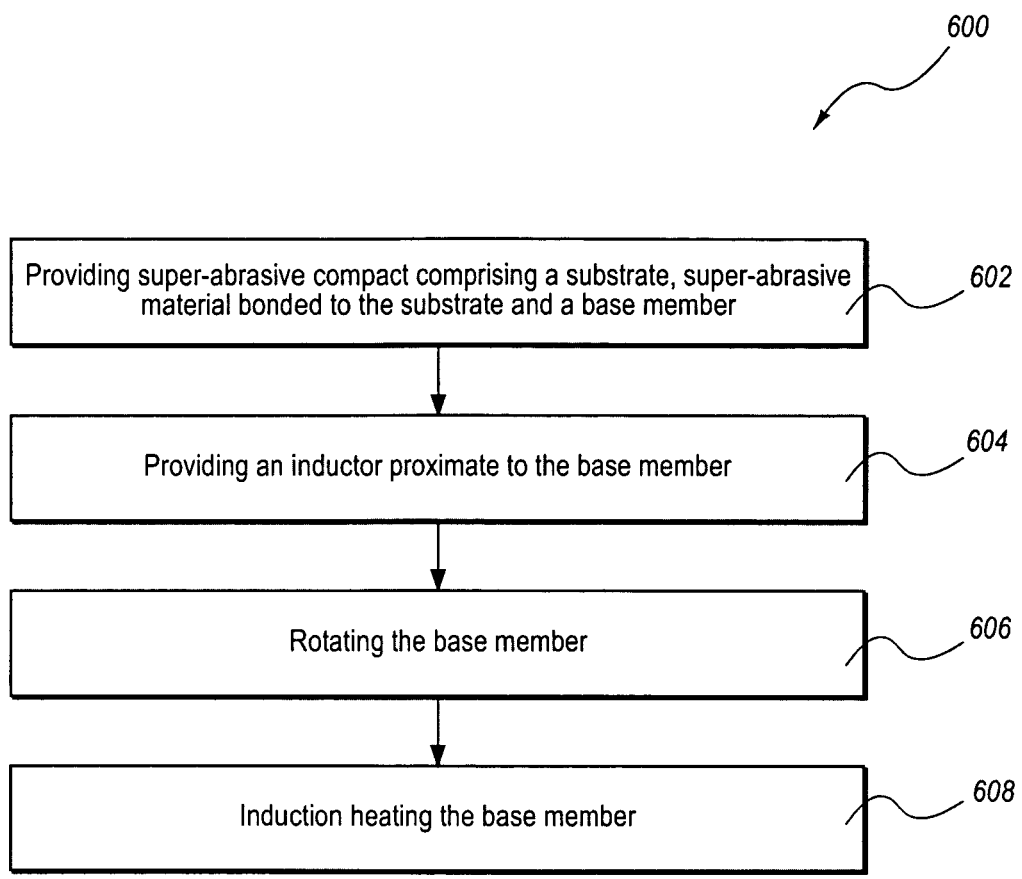
FIG. 20 is a schematic diagram of an exemplary heating method according to an additional embodiment.

FIG. 20 is a schematic diagram of an exemplary method 600 for induction heating a base member of a superabrasive compact according to various embodiments. Method 600 may additionally be used for brazing, soldering and/or welding various parts.

As illustrated in FIG. 20 (process 602), a superabrasive compact is provided. The superabrasive compact comprises a substrate, a superabrasive material bonded to the substrate, and a base member. For example, the superabrasive compact may comprise the bearing element 31 described above with reference to FIGS. 7-9. The bearing element 31 includes a substrate 74 and a table 72 bonded to the substrate. The table 72 may comprise a superabrasive material such as polycrystalline diamond, cubic boron nitride, silicon carbide, or any other suitable superhard material. The bearing element 31 may be supported by a bearing ring body 62 of a bearing ring 32. The bearing ring body 66 may function as a base member for the bearing element 31.

During process 604, an inductor is provided proximate to the base member of the superabrasive compact. For example, the induction coil 26 is shown in FIGS. 3 and 4 provided proximate to the bearing ring body 66 of the bearing ring 32. During process 606, the base member of the superabrasive compact is rotated. For example, bearing ring 32 may be supported on rotational support member 30 and rotated within an interior portion of first induction coil 26 when rotational support member 30 is raised.

During process 608, the base member is induction heated. In one example, bearing ring body 62 of bearing ring 32 may comprise a generally conductive material suitable for generating eddy currents in the presence of a magnetic field generated, such as an electromagnetic field generated from an induction coil (see, e.g., first induction coil 26 and second induction coil 28 in FIG. 4). Eddy currents generated in bearing ring body 62 of bearing ring 32 may produce heat within bearing ring body 62 through Joule heating as the eddy currents pass through and encounter resistance in bearing ring body 62. Such heating may also be referred to as induction heating.

Any process depicted in the above-disclosed methods may be practiced in any suitable sequence and in any suitable combination, without limitation. The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A heating apparatus for heating a bearing assembly having at a plurality of sliding bearing elements, each sliding bearing element having at least a portion disposed in an associated recess of a plurality of recesses formed in a bearing ring, the heating apparatus comprising:
   a support structure;
   a rotational support member coupled with the support structure, the rotational support member being removably coupled with the bearing ring of the bearing assembly and having a rotational axis about which the rotational support member is configured to rotate, the rotational support member including a plurality of jaws displaceable in a radial direction relative to the rotational axis and configured to cooperatively grasp the bearing ring of the bearing assembly;
   an inductor positioned adjacent to at least a portion of the bearing assembly to induce a magnetic flux into and heat the at least a portion of the bearing assembly;
   a plurality of bearing orienting members, each bearing orienting member of the plurality being configured to directly contact and apply a force to an associated sliding bearing element of the plurality of sliding bearing elements of the bearing assembly to maintain each sliding bearing element within its associated recess;
   wherein the rotational support member and the plurality of bearing orienting members are configured to cooperatively effect rotation of the bearing assembly about the rotational axis relative to the inductor and the support structure, and wherein each bearing orienting member is configured to maintain direct contact with its associated sliding bearing element during rotation of the bearing assembly.

2. The heating apparatus of claim 1, wherein each bearing orienting member is configured to maintain a position of its associated sliding bearing element relative to the bearing ring during rotation of rotation support member, the plurality of bearing orienting members and the bearing assembly.

3. The heating apparatus of claim 1, wherein the inductor comprises an induction coil.

4. The heating apparatus of claim 3, wherein the induction coil surrounds the rotational axis of the rotational support member.

5. The heating apparatus of claim 1, wherein the inductor comprises a first induction coil and a second induction coil.

6. An apparatus, comprising:
a radial bearing assembly to be heated, the radial bearing assembly including:
  a bearing ring comprising a conductive material,
  a plurality of discrete bearing elements disposed in the bearing ring, each bearing element of the plurality comprising a superabrasive table bonded to a substrate, and
  a braze material adjacent to the plurality of bearing elements and the bearing ring, the braze material being located and configured to braze the plurality of bearing elements to the bearing ring upon heating to a specified temperature;
a heating apparatus comprising:
an inductor positioned radially adjacent to at least a portion of the bearing assembly to induce a magnetic flux into and heat the at least a portion of the bearing assembly,
a current source electrically coupled to the inductor,
a rotational support member removably coupled with the bearing ring of the bearing assembly and configured to rotate the bearing assembly about an axis relative to the magnetic flux of the inductor, and
a bearing orienting member configured to directly contact and apply a force in a radial direction, relative to the axis, to at least one of the plurality of discrete bearing elements of the bearing assembly.

7. The apparatus of claim 6, wherein each of the plurality of bearing elements is at least partially disposed within one of a plurality of recesses defined in the bearing ring.

8. The apparatus of claim 6, wherein the inductor is a first induction coil, and wherein the heating apparatus further comprises a second induction coil.

9. An apparatus, comprising:
a radial bearing assembly to be heated, the bearing assembly including:
  a bearing ring,
  at least one sliding bearing element disposed in the bearing ring along an inner or outer circumferential surface of the bearing ring, the at least one sliding bearing element comprising a superabrasive table bonded to a substrate, and
  a braze material adjacent to the at least one bearing element and the bearing ring, the braze material being located and configured to braze the plurality of bearing elements to the bearing ring upon sufficient heating;
a heating apparatus comprising:
an inductor positioned radially adjacent to at least a portion of the bearing assembly to induce a magnetic flux into and heat the at least a portion of the bearing assembly, and
a bearing orienting member having an abutting surface that directly contacts the at least one sliding bearing element and applies a force to a surface of the at least one sliding bearing element in a desired direction relative to the inner or the outer circumferential surface of the bearing ring while the at least a portion of the bearing assembly is exposed to the magnetic flux.

10. The apparatus of claim 9, wherein the bearing orienting member exerts a force against the surface of the at least one sliding bearing element.

11. The apparatus of claim 9, wherein the superabrasive table of the at least one sliding bearing element comprises polycrystalline diamond.

12. The apparatus of claim 9, wherein the abutting surface includes a substantially planar surface.

13. The apparatus of claim 9, further comprising a stationary support member, wherein the bearing orienting member rotates relative to, and is slidingly engaged with, the stationary support member.

14. The heating apparatus of claim 1, wherein the inductor comprises at least one induction coil that is at least partially surrounded by the bearing ring.

15. The apparatus of claim 6, wherein the inductor comprises at least one induction coil that is at least partially surrounded by the bearing ring.

16. The apparatus of claim 9, wherein the inductor comprises at least one induction coil that is at least partially surrounded by the bearing ring.

17. The heating apparatus of claim 1, further comprising a mass of brazing material disposed adjacent to the at least one sliding bearing element and the bearing ring.

18. The heating apparatus of claim 1, further comprising an adjustment mechanism coupling the rotational support member to the support structure, the adjustment mechanism being configured to selectively adjust the position of the rotational support member relative to the inductor.

* * * * *

UNITED STATES PATENT AND TRADEMARK OFFICE
CERTIFICATE OF CORRECTION

PATENT NO. : 10,543,548 B2  
APPLICATION NO. : 12/425304  
DATED : January 28, 2020  
INVENTOR(S) : S. Barrett Peterson et al.

Page 1 of 1

It is certified that error appears in the above-identified patent and that said Letters Patent is hereby corrected as shown below:

In the Claims

In Claim 1, Column 20, Line 36, "having at a plurality of sliding bearing elements, each sliding" should read as -- having a plurality of sliding bearing elements, each sliding --

Signed and Sealed this  
Eighteenth Day of February, 2025

Coke Morgan Stewart  
*Acting Director of the United States Patent and Trademark Office*